(12) United States Patent
Sapra et al.

(10) Patent No.: US 12,313,882 B2
(45) Date of Patent: May 27, 2025

(54) TAPER-BASED SPOT-SIZE CONVERTER IMPLEMENTING INTERMEDIATE OPTICAL MODE CONVERTER

(71) Applicant: Ayar Labs, Inc., Santa Clara, CA (US)

(72) Inventors: Neil V. Sapra, Berkeley, CA (US);
Dries Vercruysse, Millbrae, CA (US);
Josep M. Fargas Cabanillas, Santa Clara, CA (US); John M. Fini, Albany, CA (US)

(73) Assignee: Ayar Labs, Inc., San Jose, CA (US)

( * ) Notice: Subject to any disclaimer, the term of this patent is extended or adjusted under 35 U.S.C. 154(b) by 332 days.

(21) Appl. No.: 17/717,098

(22) Filed: Apr. 10, 2022

(65) Prior Publication Data
US 2022/0326441 A1 Oct. 13, 2022

Related U.S. Application Data

(60) Provisional application No. 63/174,030, filed on Apr. 12, 2021.

(51) Int. Cl.
*G02B 6/14* (2006.01)
*G02B 6/122* (2006.01)
*G02B 6/124* (2006.01)

(52) U.S. Cl.
CPC ............. *G02B 6/14* (2013.01); *G02B 6/1228* (2013.01); *G02B 6/124* (2013.01)

(58) Field of Classification Search
CPC .................................. G02B 6/124; G02B 6/14
See application file for complete search history.

(56) References Cited

U.S. PATENT DOCUMENTS

| | | | |
|---|---|---|---|
| 5,134,681 A * | 7/1992 | Ratovelomanana | G02B 6/136 385/129 |
| 10,663,663 B2 * | 5/2020 | Painchaud | G02B 6/1228 |
| 11,467,341 B2 * | 10/2022 | Bian | G02B 6/2813 |
| 11,536,914 B2 * | 12/2022 | Bian | H01L 31/105 |
| 2004/0264902 A1 * | 12/2004 | Zoorob | G02B 6/02366 385/129 |
| 2005/0111792 A1 * | 5/2005 | Levner | G02B 6/124 385/37 |
| 2016/0091664 A1 * | 3/2016 | Doany | G02B 6/34 385/37 |

* cited by examiner

*Primary Examiner* — Eric Wong
(74) *Attorney, Agent, or Firm* — Penilla IP, APC

(57) ABSTRACT

An optical coupling device includes an optical waveguide disposed on a substrate. An index of refraction of the optical waveguide is greater than an index of refraction of the substrate. The optical coupling device includes a cladding material disposed alongside and above the optical waveguide. An index of refraction of the cladding material is less than the index of refraction of the optical waveguide. The optical coupling device includes an optical buffering layer disposed within the cladding material above the optical waveguide. The optical buffering layer has an index of refraction greater than the index of refraction of the cladding material. The optical buffering layer is positioned a distance away from a top surface of the optical waveguide so as to guide an input optical mode at controlled vertical level relative to the optical waveguide, with the input optical mode overlapping the optical waveguide.

16 Claims, 17 Drawing Sheets

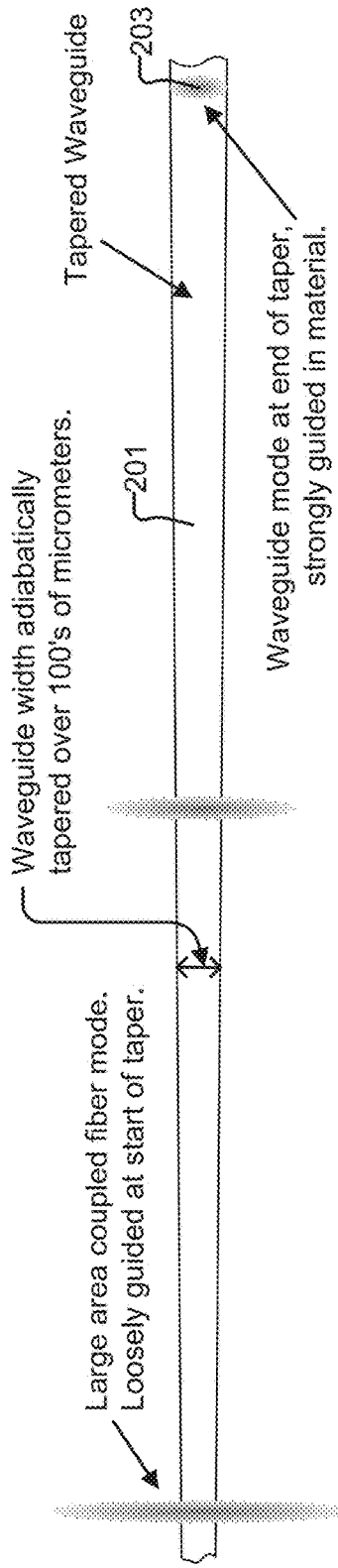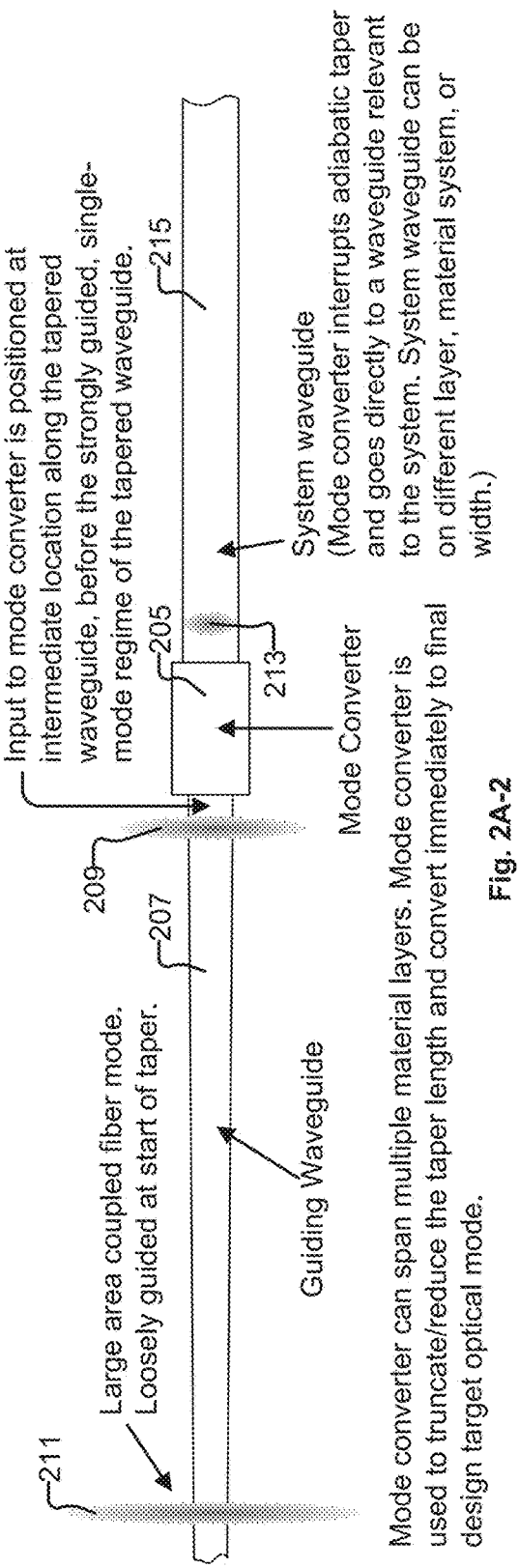

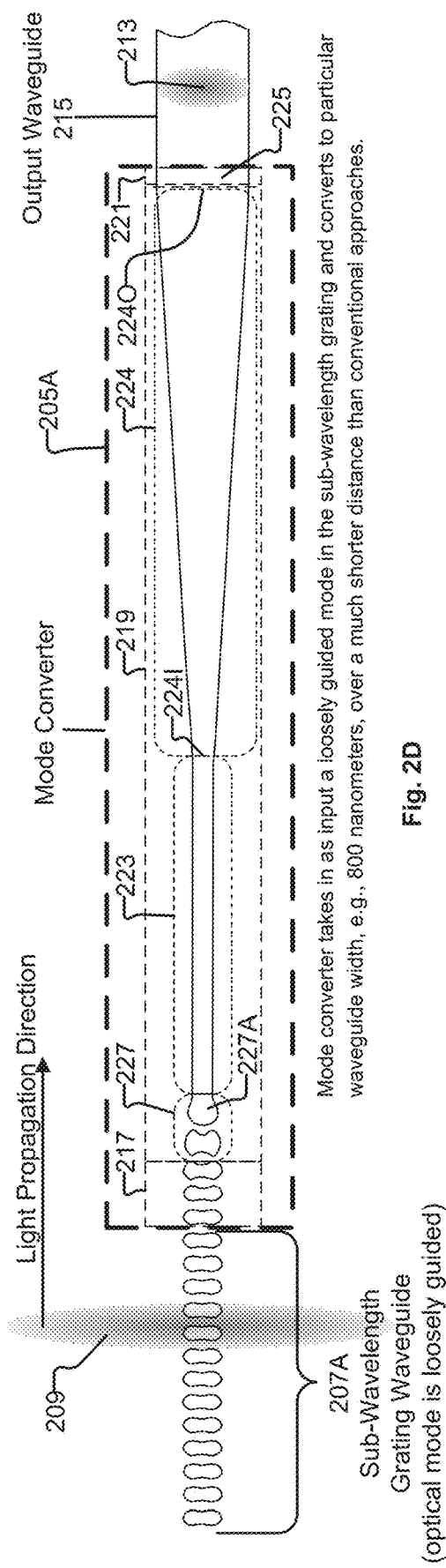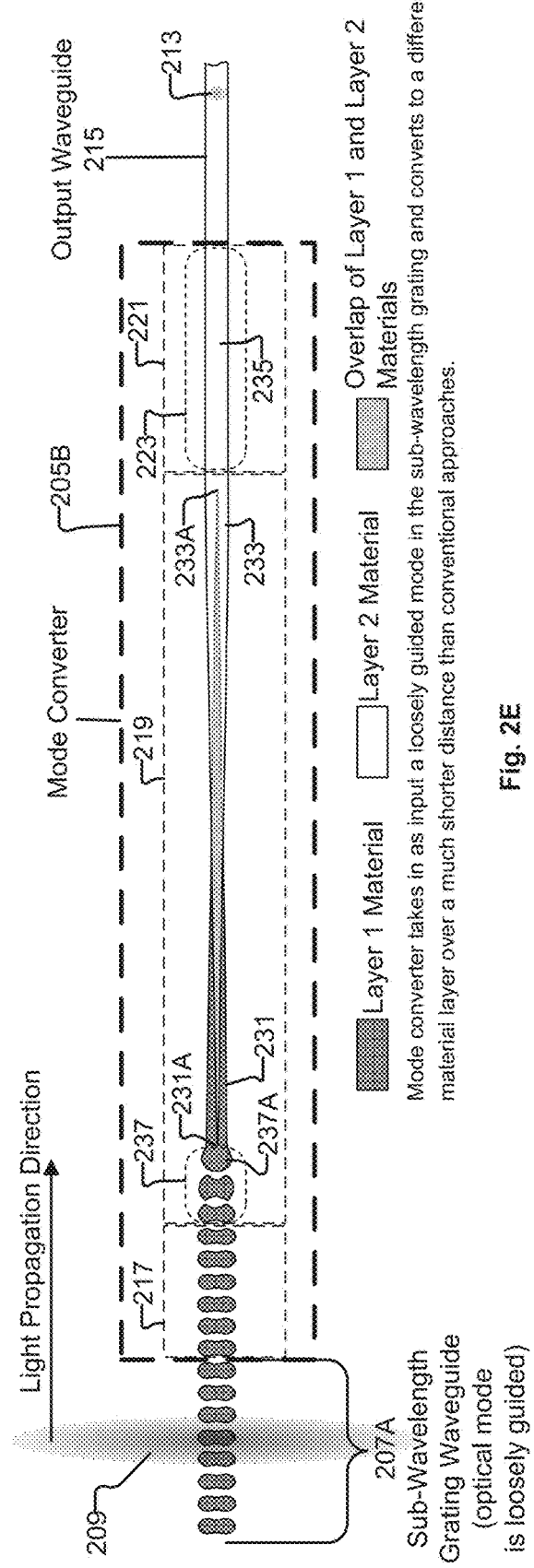
Fig. 2D
Fig. 2E

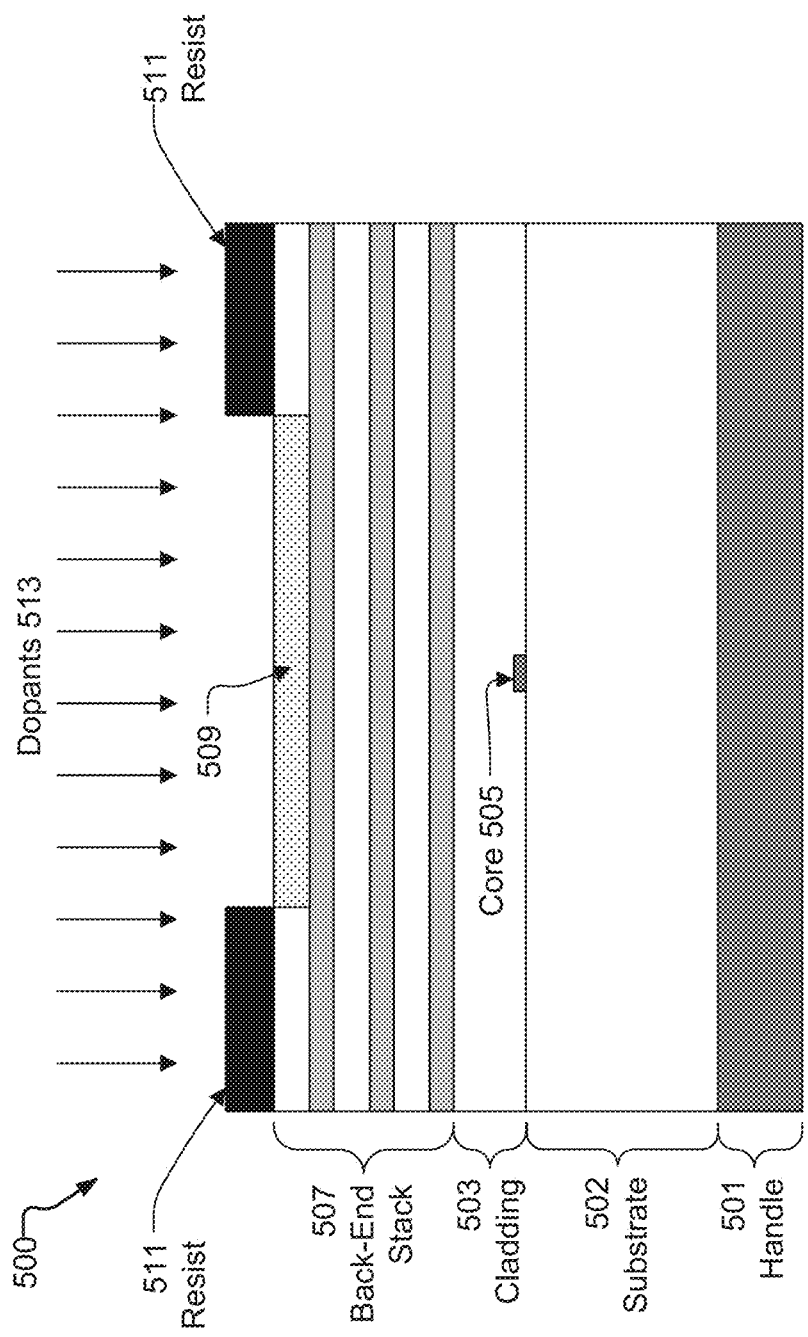

TAPER-BASED SPOT-SIZE CONVERTER IMPLEMENTING INTERMEDIATE OPTICAL MODE CONVERTER

CLAIM OF PRIORITY

This application claims priority under 35 U.S.C. 119 to U.S. Provisional Patent Application No. 63/174,030, filed on Apr. 12, 2021, the disclosure of which is incorporated herein by reference in its entirety for all purposes.

BACKGROUND

1. Field of the Invention

The disclosed embodiments relate to optical data communication.

2. Description of the Related Art

Optical data communication systems operate by modulating laser light to encode digital data patterns. The modulated laser light is transmitted through an optical data network from a sending node to a receiving node. The modulated laser light having arrived at the receiving node is de-modulated to obtain the original digital data patterns. Therefore, implementation and operation of optical data communication systems is dependent upon having reliable and efficient devices for conveying optical signals, coupling optical signals between optical waveguides, modulating optical signals, and receiving optical signals. It is within this context that the disclosed embodiments arise.

SUMMARY

In an example embodiment, an optical coupling device is disclosed. The optical coupling device includes a substrate and an optical waveguide disposed on the substrate. An index of refraction of the optical waveguide is greater than an index of refraction of the substrate. The optical coupling device also includes a cladding material disposed alongside and above the optical waveguide. An index of refraction of the cladding material is less than the index of refraction of the optical waveguide. The optical coupling device also includes an optical buffering layer disposed within the cladding material above the optical waveguide. The optical buffering layer has an index of refraction greater than the index of refraction of the cladding material. The optical buffering layer is positioned a distance away from a top surface of the optical waveguide so as to guide an input optical mode at controlled vertical level relative to the optical waveguide, with the input optical mode overlapping the optical waveguide.

In an example embodiment, an optical mode converter is disclosed. The optical mode converter includes an input optical guiding section configured to receive and guide an input optical mode. The input optical guiding section has a transverse size that is less than a transverse size of the input optical mode. The transverse sizes of the input optical guiding section and the input optical mode are measured in a direction perpendicular to a propagation direction of the input optical mode. The optical mode converter also includes an output optical guiding section. The optical mode converter also includes an optical mode conversion section disposed between the input optical guiding section and the output optical guiding section. The optical mode conversion section is configured to convert the input optical mode to an output optical mode that has a transverse size substantially confined within a transverse size of an output optical waveguide that is optically connected to the output optical guiding section. The transverse sizes of the output optical mode and the output optical waveguide are measured in a direction perpendicular to a propagation direction of the output optical mode.

In an example embodiment, an optical mode converter is disclosed. The optical mode converter includes an input optical guiding section configured to receive and guide an input optical mode. The input optical guiding section is formed at first vertical level. The input optical guiding section has a transverse size that is less than a transverse size of the input optical mode. The transverse sizes of the input optical guiding section and the input optical mode are measured in a direction perpendicular to a propagation direction of the input optical mode. The optical mode converter also includes an output optical guiding section formed at a second vertical level that is different than the first vertical level. The optical mode converter also includes an optical mode conversion section disposed between the input optical guiding section and the output optical guiding section. The optical mode conversion section spans both the first vertical level and the second vertical level. The optical mode conversion section is configured to convert the input optical mode to an output optical mode that has a transverse size substantially confined within a transverse size of an output optical waveguide that is optically connected to the output optical guiding section. The transverse sizes of the output optical mode and the output optical waveguide are measured in a direction perpendicular to a propagation direction of the output optical mode.

In an example embodiment, an optical coupler is disclosed. The optical coupler includes an input sub-wavelength grating extending in a substantially linear configuration. The optical coupler also includes a strip optical waveguide that includes a first curved section that extends toward the input sub-wavelength grating and that turns parallel to the input sub-wavelength grating. The strip optical waveguide also includes a coupling section that extends from the first curved section substantially parallel to the input sub-wavelength grating. The coupling section is positioned within an evanescent optical coupling distance of the input sub-wavelength grating. The strip optical waveguide also includes a second curved section that extends from the coupling section and that curves away from the input sub-wavelength grating.

In an example embodiment, an optical coupler is disclosed. The optical coupler includes an input sub-wavelength grating extending in a substantially linear configuration. The input sub-wavelength grating has a terminal tapered section. The optical coupler also includes a target optical waveguide extending in a substantially linear configuration substantially parallel to the input sub-wavelength grating. The target optical waveguide is formed as a strip-type optical waveguide. The target optical waveguide has an input inverse taper section positioned within an evanescent optical coupling distance of the terminal tapered section of the input sub-wavelength grating, so as to form an optical coupling region between the input sub-wavelength grating and the target optical waveguide.

In an example embodiment, an optical coupling device is disclosed. The optical coupling device includes a handle and a substrate. The optical coupling device also includes an optical waveguide disposed on the substrate. An index of refraction of the optical waveguide is greater than an index of refraction of the substrate. The optical coupling device also includes a cladding material disposed alongside and above the optical waveguide. An index of refraction of the cladding material is less than the index of refraction of the optical waveguide. The optical coupling device also includes a back-end stack formed above the cladding material. The back-end stack includes a doped layer formed above the optical waveguide. The doped layer is positioned and configured to guide an optical mode at a sufficiently high vertical level relative to the handle so as to substantially prevent interaction of the optical mode with the handle.

Other aspects and advantages of the disclosed embodiments will become more apparent from the following detailed description, taken in conjunction with the accompanying drawings, illustrating by way of example the disclosed embodiments.

BRIEF DESCRIPTION OF THE DRAWINGS

FIG. 2A-1 shows a diagram of an adiabatically tapered optical mode converter that has a taper extending over hundreds of micrometers to achieve a required optical waveguide optical mode, in accordance with some embodiments.

FIG. 2A-2 shows insertion of an intermediate optical mode converter along a tapered optical waveguide, in accordance with some embodiments.

FIG. 2D shows an example of an intermediate optical mode converter, in accordance with some embodiments.

FIG. 2E shows an example of an intermediate optical mode converter that is built-up of at least two layers of materials, in accordance with some embodiments.

FIG. 5D shows use of a mask or patterned photoresist to spatially control disposal of dopants in the back-end stack for refractive index modification, so that dopants are only incorporated where desired, in accordance with some embodiments.

DETAILED DESCRIPTION

Figure 1A:
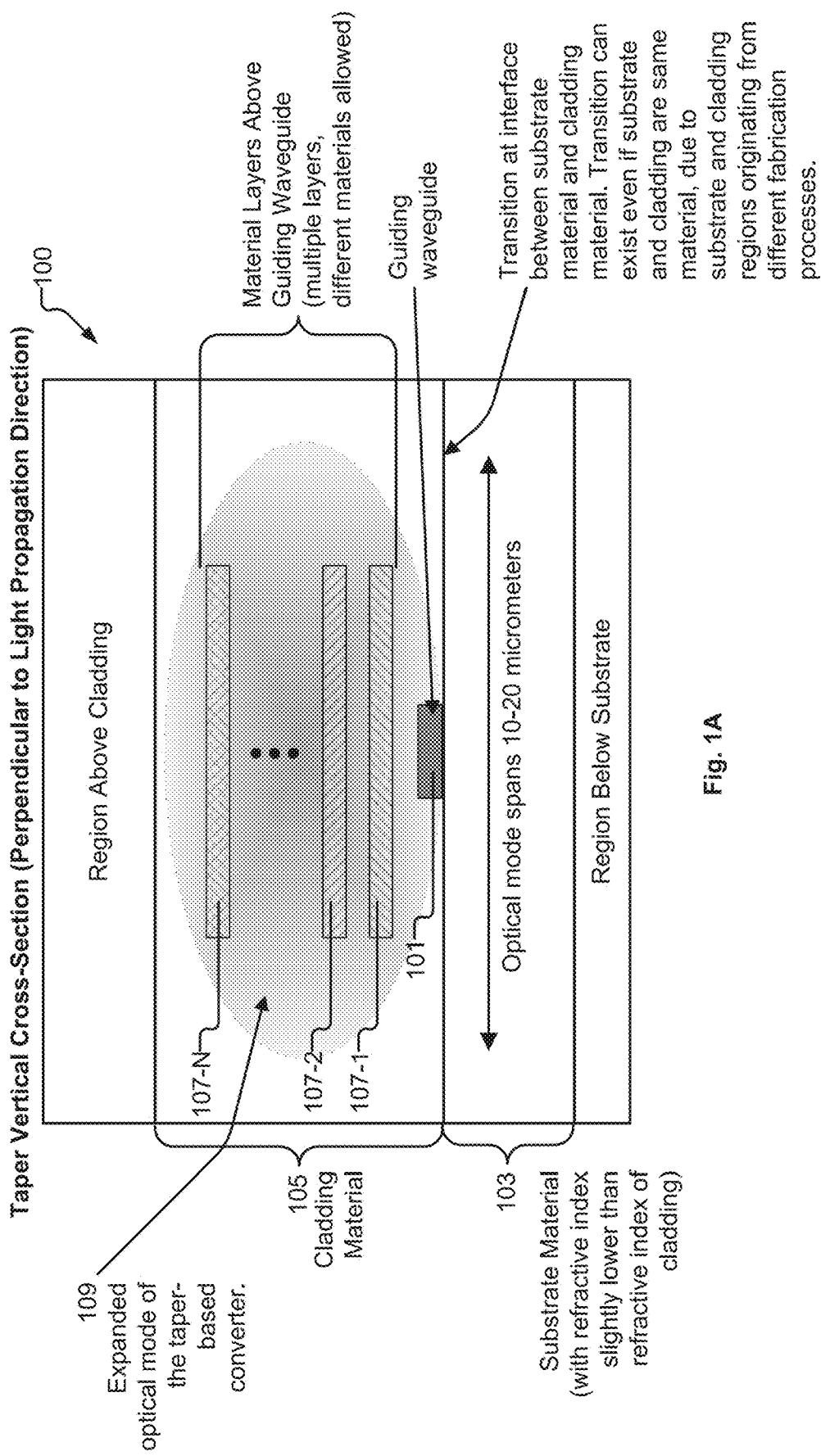
FIG. 1A shows a vertical cross-section through a taper-based spot-size converter, in accordance with some embodiments.

In the following description, numerous specific details are set forth in order to provide an understanding of the disclosed embodiments. It will be apparent, however, to one skilled in the art that the disclosed embodiments may be practiced without some or all of these specific details. In other instances, well known process operations have not been described in detail in order not to unnecessarily obscure the disclosed embodiments.

Coupling of light from an external light source to an on-chip optical waveguide presents a challenge due to the large dimensional mismatch between the large diameter free-space of the optical mode in the external optical fiber and the tightly confined optical mode of the on-chip optical waveguide. In some embodiments, light is coupled from the optical fiber to the on-chip optical waveguide by using an adiabatically inverse tapered optical waveguide, such that the optical mode is expanded at the narrow-end (input-end) of the inverse tapered optical waveguide for better overlap with the large external optical mode of the optical fiber, and where the inverse tapered optical waveguide is adiabatically inverse tapered (from smaller size to larger size) over a long distance (hundreds of micrometers) to the target optical waveguide width at which the optical mode is more strongly confined. Also, in some embodiments, adiabatically inverse tapered optical waveguides include patterned sub-wavelength gratings in the inverse tapered optical waveguide to further assist with expansion of the optical mode transverse profile (i.e., the profile in the plane perpendicular to light propagation direction) by reduction of the effective index of the optical modes. Physical implementation of the adiabatically inverse tapered optical waveguide for optical coupling presents challenges related to overall efficiency of the optical system and robustness in fabrication. For example, adiabatically inverse tapered optical waveguide optical mode converters can be sensitive to variation in fabrication, and can be limited in the design process for the material platform and geometry of the input and output optical modes.

Various taper-based spot-size converter embodiments are disclosed herein for providing increased efficiency in fiber-to-chip optical coupling and for improving robustness in fabrication and optical mode coupling, thereby improving electro-optical device yield, reliability, and performance. The various taper-based spot-size converter embodiments disclosed herein improve overall efficiency of the system through consideration of insertion loss, non-linear absorption, coupling to higher order optical modes, and robustness in fabrication. More specifically, some of the taper-based spot-size converter embodiments disclosed herein use additional material layers within the chip in order to increase robustness to process variations of the cladding and/or substrate material. Also, some of the taper-based spot-size converter embodiments disclosed herein use optical mode converters that receive input light of an intermediate optical mode from a tapered input optical waveguide and output light in an optical mode of an on-chip optical waveguide of different material and/or geometry (relative to the tapered input optical waveguide) to provide benefits to system performance and/or fabrication. Also, some of the taper-based spot-size converter embodiments disclosed herein avoid the use of transition elements from a sub-wavelength grating-based taper through off-axis optical couplers.

At the taper tip (the narrow, light input end of the taper), the guided optical mode of the taper-based spot-size converter is very large and has significant overlap with the higher-order optical modes that have a large spatial extent in the cladding material that surrounds the optical waveguide. The overlap of the guided optical mode with the higher-order optical modes provides a loss mechanism because optical power is transferred from the desired fundamental optical mode to these other higher-order optical modes. Moreover, an optical mode with size comparable to standard optical fibers is sensitive to small variations in the refractive index of the cladding material, e.g., on the order of 0.001. Optical modes of the optical waveguide will tend to shift spatially towards a region of even slightly greater refractive index, thus increasing the overlap with the higher order optical modes within the cladding material. In various taper-based spot-size converter embodiments disclosed herein, one or more additional layer(s) of material(s) is/are disposed above and/or below the optical waveguide to add additional structure to the optical mode in the cladding to buffer against small variations in the refractive index of the cladding material to which the taper design may be sensitive.

FIG. 1A shows a vertical cross-section through a taper-based spot-size converter 100, in accordance with some embodiments. The vertical cross-section of FIG. 1A extends through the taper-based spot-size converter 100 perpendicular to the light propagation direction (where the light propagation direction is perpendicular to the page and into the page). The taper-based spot-size converter 100 includes an optical waveguide 101 disposed on a substrate 103. An index of refraction of the optical waveguide 101 is greater than an index of refraction of the substrate 103. A cladding material 105 is disposed alongside and above the optical waveguide 101, so as to surround the optical waveguide 101. An index of refraction of the cladding material 105 is less than the index of refraction of the optical waveguide 101. A number (N) of optical buffering layers 107-1 to 107-N, where N is an integer value greater than or equal to one, are disposed within the cladding material 105 above the optical waveguide 101. In some embodiments, the optical buffering layers 107-1 to 107-N are vertically stacked, with the cladding material 105 interposed between vertically adjacent ones of the optical buffering layers 107-1 to 107-N. Each of the optical buffering layers 107-1 to 107-N has an index of refraction greater than the index of refraction of the cladding material 105. The optical buffering layers 107-1 to 107-N are positioned a distance away from a top surface of the optical waveguide 101 so as to guide an input optical mode 109 at controlled vertical level relative to the optical waveguide 101, with the input optical mode 109 overlapping the optical waveguide 101. In some embodiments, the optical buffering layers 107-1 to 107-N are formed of a doped material. However, in various embodiments, the optical buffering layers 107-1 to 107-N can be formed of essentially any type of light guiding material that has an index of refraction greater than the index of refraction of the cladding material 105. In some embodiments, each of the optical buffering layers 107-1 to 107-N is formed of a same material. However, in some embodiments, different ones of the optical buffering layers 107-1 to 107-N are formed of different materials.

The optical buffering layers 107-1 to 107-N add additional structure to the optical mode 109 in the cladding material 105 to buffer against small variations in the index of refraction of the cladding material 105 to which the taper-based spot-size converter 100 may be sensitive. In some embodiments, the optical buffering layers 107-1 to 107-N formed within the cladding material 105 above the guiding optical waveguide 101 have widths on the scale of the input optical mode 109. For example, the input optical mode 109 for a standard single optical mode optical fiber (e.g., SMF-28 telecom fiber) is about 10 micrometers to about 20 micrometers. In some embodiments, a transverse size of one or more of the optical buffering layer(s) 107-1 to 107-N as measured perpendicular to a direction of propagation of the input optical mode 109 is approximately equal to a transverse size of the input optical mode 109. However, in some embodiments, the transverse size of one or more of the optical buffering layer(s) 107-1 to 107-N as measured perpendicular to the direction of propagation of the input optical mode 109 is larger than the transverse size of the input optical mode 109. Also, in some embodiments, the transverse size of one or more of the optical buffering layer(s) 107-1 to 107-N as measured perpendicular to the direction of propagation of the input optical mode 109 is smaller than the transverse size of the input optical mode 109. In the example of FIG. 1A, the transverse size of the input optical mode 109 is measured horizontally across the page in a direction parallel to the top surface of the optical waveguide 101. Similarly, in the example of FIG. 1A, the transverse size of the optical buffering layer(s) 107-1 to 107-N is also measured horizontally across the page in the direction parallel to the top surface of the optical waveguide 101.

Figure 1B:
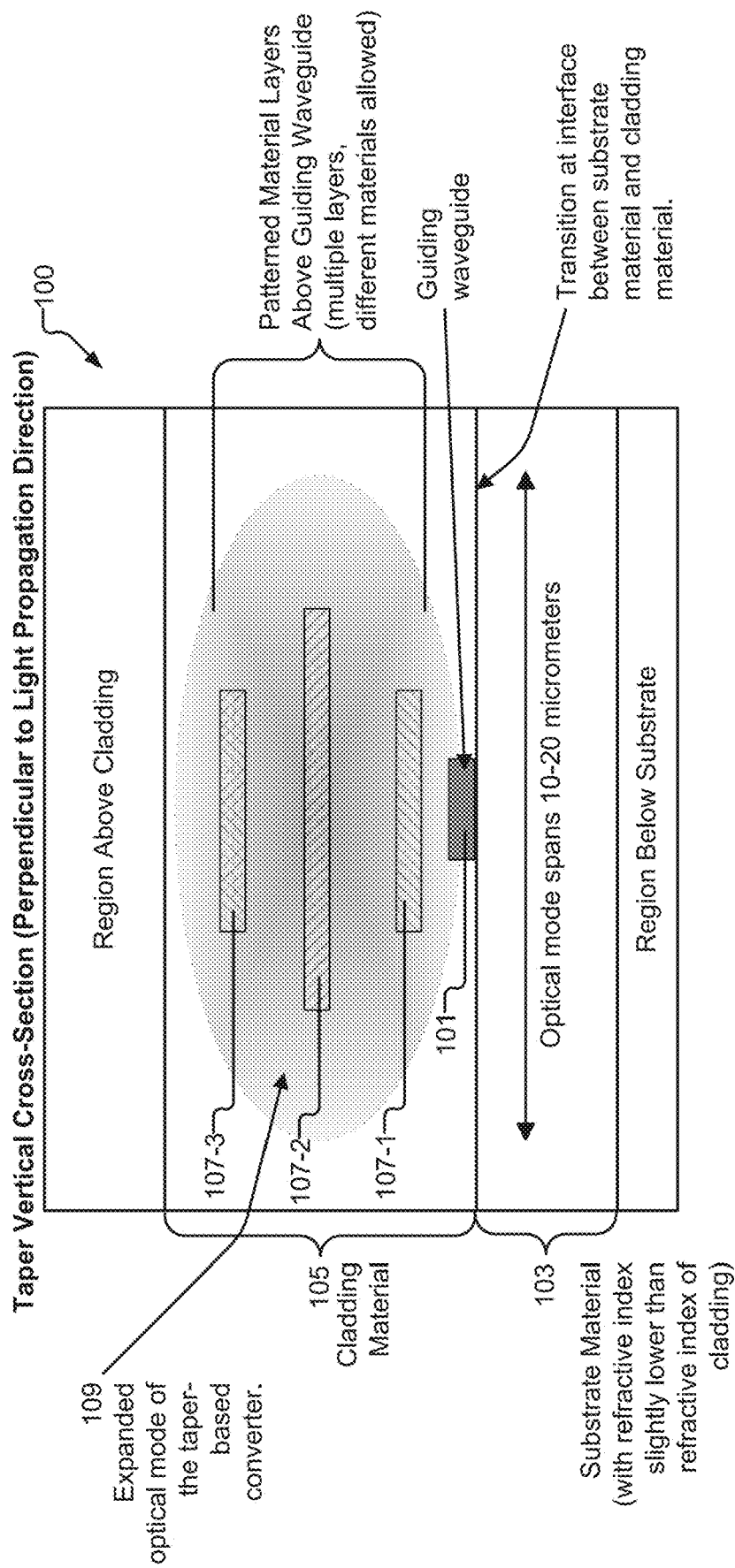
FIG. 1B shows a variation of the vertical cross-section through the taper-based spot-size converter of FIG. 1A in which some of the optical buffering layer(s) formed within the cladding material above the guiding optical waveguide have reduced widths relative to the others, in accordance with some embodiments.

In some embodiments, one or more of the optical buffering layer(s) 107-1 to 107-N formed with the cladding material 105 above the guiding optical waveguide 101 can be patterned and have their width(s) reduced to optimize the performance of the optical mode converter 100. FIG. 1B shows a variation of the vertical cross-section through the taper-based spot-size converter 100 of FIG. 1A in which some of the optical buffering layer(s) 107-1 to 107-N formed within the cladding material 105 above the guiding optical waveguide 101 have reduced widths relative to the others, in accordance with some embodiments. In the example of FIG. 1B, N equals three, such that there are three optical buffering layers 107-1 to 107-3. The optical buffering layers 107-1 and 107-3 have reduced widths relative to optical buffering layer 107-2. Therefore, the example of FIG. 1B shows at least two of the plurality of optical buffering layers 107-1 to 107-3 having different transverse sizes as measured perpendicular to the direction of propagation of the input optical mode 109.

Also, in some embodiments, one or more of the optical buffering layers 107-1 and 107-N formed within the cladding material 105 above the guiding optical waveguide 101 can be patterned/shaped as an inverse taper themselves, including with sub-wavelength grating structures, to assist in the coupling of the optical mode 109 to the optical waveguide 101. For example, in some embodiments, a narrow end (light input end) of the inverse tapered optical buffering layer 107-x, where x is any of 1 to N, is positioned to receive the input optical mode from the external optical waveguide (e.g., external optical fiber). In some embodiments, the optical waveguide 101 also has an inverse taper shape that substantially matches the inverse taper shape of the overlying optical buffering layers 107-1 to 107-N. In some embodiments, the optical buffering layers 107-1 and 107-N and the optical waveguide 101 are configured as respective strip structures that each has a respective constant transverse size along the light propagation direction.

Figure 1C:
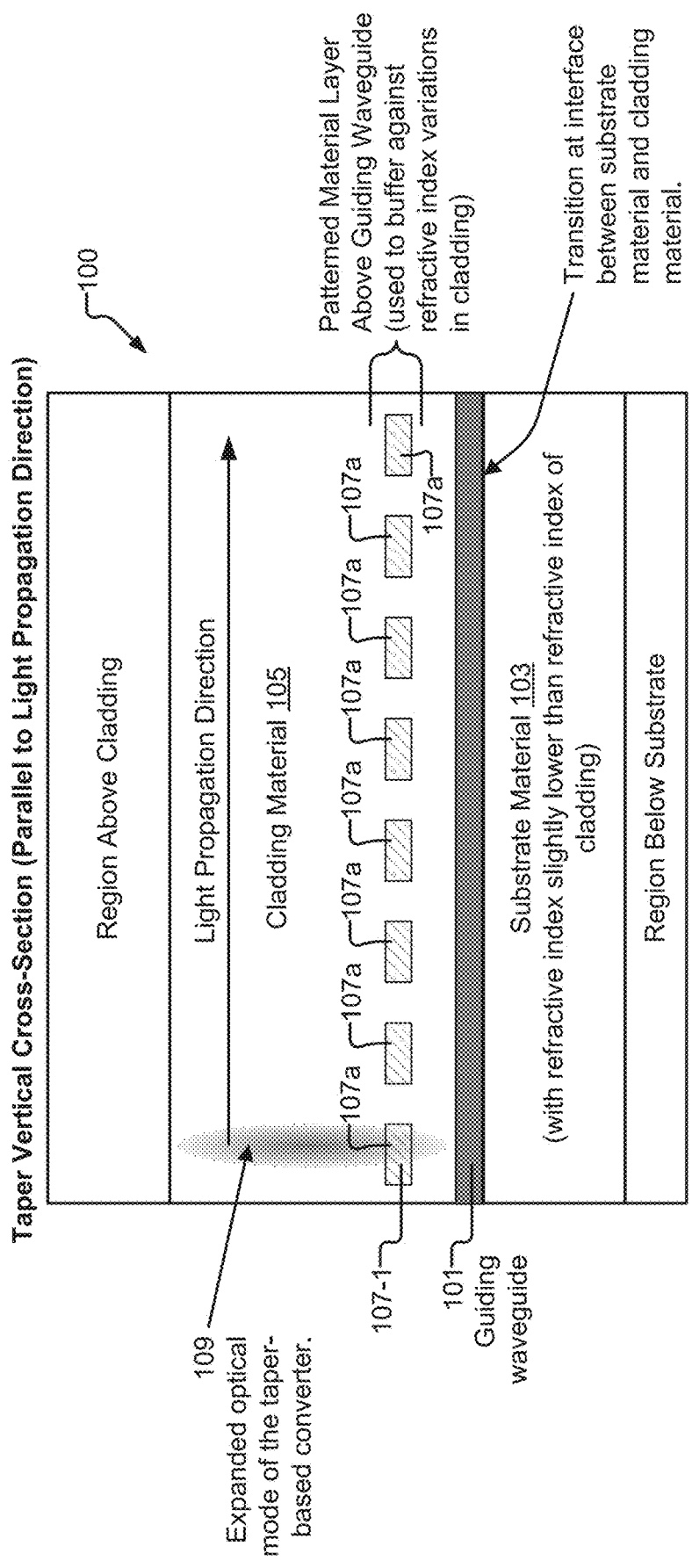
FIG. 1C shows a vertical cross-section extending through the taper-based spot-size converter parallel to the light propagation direction, in accordance with some embodiments.

FIG. 1C shows a vertical cross-section extending through the taper-based spot-size converter 100 parallel to the light propagation direction, in accordance with some embodiments. The example of FIG. 1C includes one optical buffering layer 107-1 disposed within the cladding material 105 above the guiding optical waveguide 101. The optical buffering layer 107-1 is formed as a sub-wavelength grating that includes multiple optical grating elements 107a arranged in a linear configuration that extends along the light propagation direction (along the optical waveguide 101). In some embodiments, the optical buffering layer 107-1 formed as the sub-wavelength grating is configured to have a substantially constant transverse size along the light propagation direction. In some embodiments, each of the multiple optical grating elements 107a has a substantially same size and is positioned in accordance with a substantially fixed pitch (center-to-center spacing as measured in the light propagation direction). However, in some embodiments, different ones of the multiple optical grating elements 107a can have different sizes. Also, in some embodiments, the multiple optical grating elements 107a can be positioned to have different center-to-center spacings as measured in the light propagation direction. In some embodiments, the optical buffering layer 107-1 formed as the sub-wavelength grating has an inverse taper shape along the light propagation direction. It should be understood that the example of FIG. 1C shows the one optical buffering layer 107-1 by way of example. In various embodiments, the taper-based spot-size converter 100 can include any number N of optical buffering layers 107-1 to 107-N that have the sub-wavelength grating configuration. Also, in various embodiments, the one or more optical buffering layer(s) 107-1 to 107-N formed within the cladding material 105 above the guiding optical waveguide 101 can be co-optimized with the inverse taper itself in the design process. For example, in some embodiments, the taper-based spot-size converter 100 includes a plurality of optical buffering layers 107-1 to 107-N formed as a respective plurality of inverse tapers. Also, in some embodiments, the taper-based spot-size converter 100 includes a plurality of optical buffering layers 107-1 to 107-N formed as a respective plurality of sub-wavelength gratings. Also, in some embodiments, the taper-based spot-size converter 100 includes a plurality of optical buffering layers 107-1 to 107-N formed as a respective plurality of sub-wavelength gratings, where each of the plurality of sub-wavelength gratings has a respective inverse taper shape.

Figure 1D:
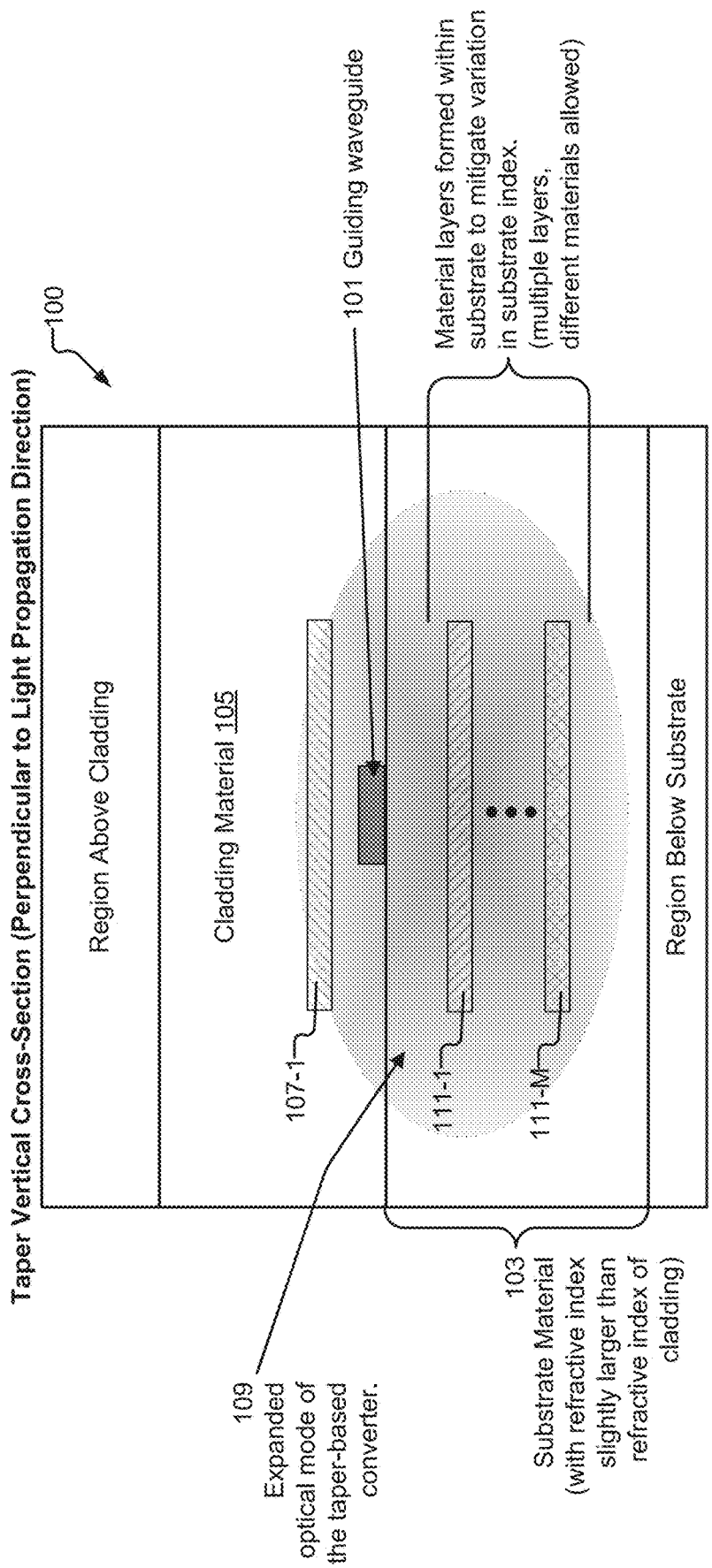
FIG. 1D shows a vertical cross-section extending through the taper-based spot-size converter perpendicular to the light propagation direction in which a plurality of optical buffering layers are disposed within the substrate, in accordance with some embodiments.

In some embodiments, a sensitivity to small variations of the refractive index can exist in the substrate 103, rather than in the cladding material 105 that surrounds the guiding optical waveguide 101. In these situations, one or more optical buffering layers 111-1 to 111-M, where M is an integer greater than or equal to 1, can be formed within the substrate 103. FIG. 1D shows a vertical cross-section extending through the taper-based spot-size converter 100 perpendicular to the light propagation direction, in which a plurality of optical buffering layers 111-1 to 111-M are disposed within the substrate 103, in accordance with some embodiments. To differentiate from the optical buffering layers 107-1 to 107-N disposed in the cladding material 105, the plurality of optical buffering layers 111-1 to 111-M disposed/formed in the substrate 103 are also referred to as sub-level optical buffering layers 111-1 to 111-M. In some embodiments, the substrate 103 is formed of a material that has an index of refraction slightly larger than the index of refraction of the cladding material 105, which will cause the input optical mode 109 to preferentially propagate through the substrate 103 rather than through the cladding material 105. Also, the sub-level optical buffering layers 111-1 to 111-M are vertically positioned with the substrate 103 relative to the optical waveguide 101 such that the input optical mode 109 (as preferentially guided within the substrate 103) overlaps the optical waveguide 101.

In some embodiments, the sub-level optical buffering layers 111-1 to 111-M are formed of a doped material. However, in various embodiments, the sub-level optical buffering layers 111-1 to 111-M can be formed of essentially any type of light guiding material that has an index of refraction greater than the index of refraction of the substrate 103. In some embodiments, each of the sub-level optical buffering layers 111-1 to 111-M is formed of a same material. However, in some embodiments, different ones of the sub-level optical buffering layers 111-1 to 111-M are formed of different materials.

In some embodiments, a transverse size of one or more of the sub-level optical buffering layers 111-1 to 111-M, as measured perpendicular to a direction of propagation of the input optical mode 109, is larger than a transverse size of the input optical mode 109. In some embodiments, a transverse size of one or more of the sub-level optical buffering layers 111-1 to 111-M, as measured perpendicular to a direction of propagation of the input optical mode 109, is approximately equal to a transverse size of the input optical mode 109. In some embodiments, a transverse size of one or more of the sub-level optical buffering layers 111-1 to 111-M, as measured perpendicular to a direction of propagation of the input optical mode 109, is smaller than a transverse size of the input optical mode 109. In some embodiments, each of the sub-level optical buffering layers 111-1 to 111-M disposed within the substrate 103 can be patterned/shaped to have either a constant transverse size strip shape, an inverse taper shape, and/or a sub-wavelength grating shape. In some embodiments, one or more of the sub-level optical buffering layers 111-1 to 111-M is formed as an inverse taper. In some embodiments, one or more of the sub-level optical buffering layers 111-1 to 111-M is formed as a sub-wavelength grating. In some embodiments, one or more of the sub-level optical buffering layers 111-1 to 111-M is formed as an inverse taper sub-wavelength grating.

FIG. 1D also shows an optical buffering layer 107-1 disposed in the cladding material 105 above the guiding optical waveguide 101. It should be understood that in various embodiments, the taper-based spot-size converter 100 can include any number of optical buffering layers 107-1 to 107-N disposed in the cladding material 105 in conjunction with any number of optical buffering layers 111-1 to 111-M disposed within the substrate 103. Also, in some embodiments, the taper-based spot-size converter 100 can include the optical buffering layers 111-1 to 111-M disposed within the substrate 103, without including any optical buffering layers 107-1 to 107-N disposed in the cladding material 105. Conversely, in some embodiments, the taper-based spot-size converter 100 can include the optical buffering layers 107-1 to 107-N disposed within the cladding material 105, without including any optical buffering layers 111-1 to 111-M disposed in the substrate 103.

Some taper-based optical mode converters require the optical waveguide to taper over a very large distance (hundreds of micrometers), which can adversely consume a large amount of chip area, translating to cost in manufacturing. FIG. 2A-1 shows a diagram of an adiabatically tapered optical mode converter 201 that has a taper extending over hundreds of micrometers to achieve a required optical waveguide optical mode 203, in accordance with some embodiments. Because some photonic converters require a single-optical mode and tightly-confined optical waveguide optical mode as the input for operation, the entire length of the adiabatically tapered optical mode converter 201 must be traversed before enabling a conversion/transition to another optical waveguide platform or geometry. Once the optical mode 203 begins to become confined within the optical waveguide 201, non-linear processes such as two-photon absorption and free-carrier absorption can introduce large optical losses to the system. Also, the material used for the optical coupling (for the adiabatically tapered optical mode converter) is often not ideal for further down-stream photonics requirements.

FIG. 2A-2 shows insertion of an intermediate optical mode converter 205 along a tapered optical waveguide 207, in accordance with some embodiments. In some embodiments, the tapered optical waveguide 207 is a portion of the adiabatically tapered optical waveguide 201. In some embodiments, the intermediate optical mode converter 205 receives as input the optical mode 209 at what would be a about the mid-point of the adiabatically tapered optical waveguide 201. Therefore, in these embodiments, the tapered optical waveguide 207 is configured as about the first half (lengthwise) of the adiabatically tapered optical waveguide 201. In this manner, the optical mode 209 at the input to the intermediate optical mode converter 205 has been reduced in transverse size from the transverse size of the incoming optical mode 211. The intermediate optical mode converter 205 converts the optical mode 209 to a tightly confined optical mode 213 of an arbitrary optical waveguide geometry 215 and/or to the material system required by the designer for their application.

Figure 2B:
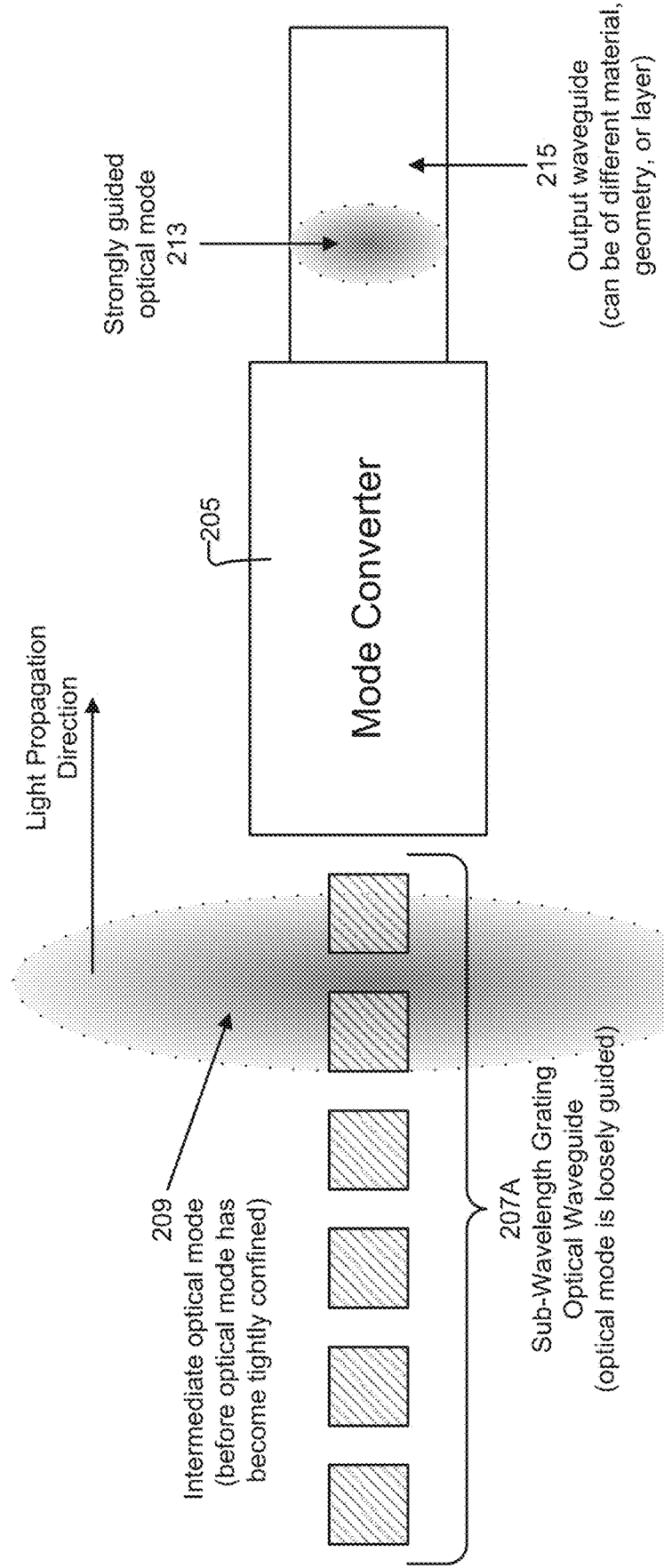
FIG. 2B shows a diagram of an input optical waveguide connected to the intermediate optical mode converter, where the input optical waveguide is formed as a sub-wavelength grating optical waveguide, in accordance with some embodiments.

In some embodiments, the input optical waveguide 207 can be of the form of a sub-wavelength grating. FIG. 2B shows a diagram of an input optical waveguide 207A connected to the intermediate optical mode converter 205, where the input optical waveguide 207A is formed as a sub-wavelength grating optical waveguide, in accordance with some embodiments. It should be understood that the input optical mode 209 to the intermediate optical mode converter 205 is loosely confined (has a transverse size larger than the transverse size of the input optical waveguide 207A).

Use of the intermediate optical mode converter 205 advantageously reduces the footprint of the device and lowers non-linear losses that would otherwise accrue through tightly confined propagation of the optical mode through optical waveguide material. For silicon optical waveguides, this can be understood as an optical waveguide with the ratio $n_{eff}/n_{cladding} < 1.3$, where $n_{eff}$ is the effective index of the input TE optical mode and $n_{cladding}$ is the refractive index of the cladding material. For silicon-on-insulator optical waveguides of thickness of about 160 nanometers, the width that achieves the ratio $n_{eff}/n_{cladding} = 1.3$, is about 273 nanometers at 1290 nanometer operating wavelength, and is about 377 nanometers at about 1550 nanometer operating wavelength. For silicon-on-insulator optical waveguides of thickness of about 220 nanometers, the width that achieves this ratio $n_{eff}/n_{cladding} = 1.3$, is about 234 nanometers at 1290 nanometer operating wavelength, and is about 311 nanometers at 1550 nanometer operating wavelength.

Figure 2C:
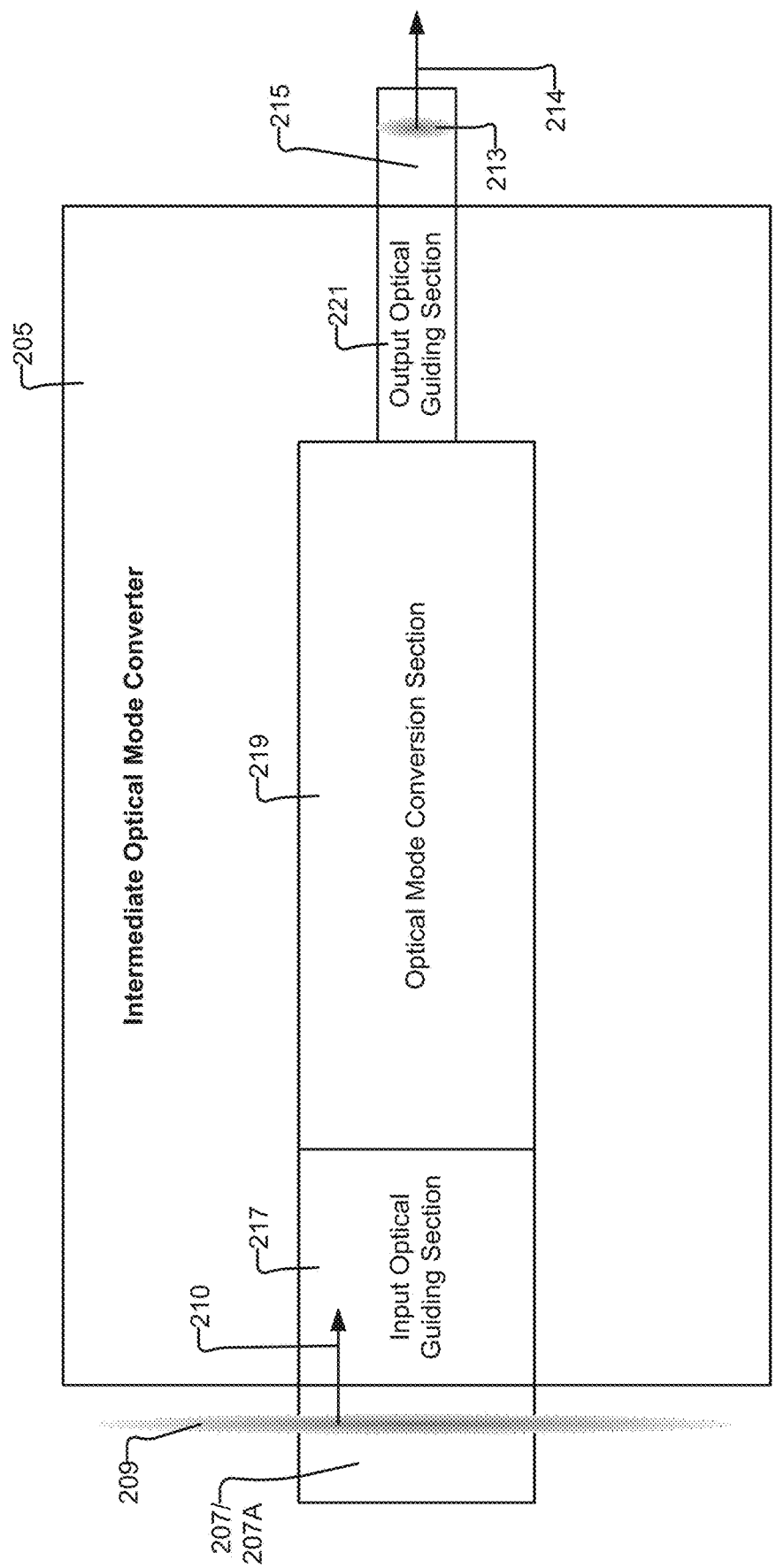
FIG. 2C shows an example diagram of the intermediate optical mode converter, in accordance with some embodiments.

FIG. 2C shows an example diagram of the intermediate optical mode converter 205, in accordance with some embodiments. The intermediate optical mode converter 205 includes an input optical guiding section 217 configured to receive and guide the input optical mode 209 from the input optical waveguide 207/207A. The input optical guiding section 217 has a transverse size that is less than a transverse size of the input optical mode 209. The transverse sizes of the input optical guiding section 217 and the input optical mode 209 are measured in a direction perpendicular to a propagation direction 210 of the input optical mode 209. In some embodiments, the input optical guiding section 217 includes an inverse taper shaped optical waveguide. In some embodiments, the input optical guiding section 217 includes a sub-wavelength grating optical waveguide. The intermediate optical mode converter 205 also includes an output optical guiding section 221 and an optical mode conversion section 219. The optical mode conversion section 219 is disposed between the input optical guiding section 217 and the output optical guiding section 221. The optical mode conversion section 219 is configured to convert the input optical mode 209 to the output optical mode 213 having a transverse size substantially confined within a transverse size of the output optical waveguide 215 that is optically connected to the output optical guiding section 221. The transverse sizes of the output optical mode 213 and the output optical waveguide 215 are measured in a direction perpendicular to a propagation direction 214 of the output optical mode 213. In some embodiments, the transverse size of an optical waveguide within the output optical guiding section 221 is substantially equal to a transverse size of the output optical waveguide 215. In some embodiments, the output optical guiding section 221 is a portion of the output optical waveguide 215. It should be understood that the optical mode conversion section 219 is configured to convert the input optical mode 209 to the output optical mode 213 over a shorter distance (light propagation distance) than what is achievable using just an adiabatically inverse tapered optical mode converter.

In some embodiments, the intermediate optical mode converter 205 is used to reduce power-dependent losses, where the input optical waveguide is constructed out of a material susceptible to large non-linear absorption, such as a silicon optical waveguide. For example, the intermediate optical mode converter 205 can be used to convert to another optical waveguide material, such as a nitride optical waveguide material, to provide for mitigation of non-linear absorption before the optical mode enters a more strongly confined portion of the adiabatically tapered silicon optical waveguide material that is connected to the input of the intermediate optical mode converter 205. It should be understood that use of the intermediate optical mode converter 205 serves to truncate/reduce the size of the standard inverse adiabatically tapered optical mode converter (such as shown in FIG. 2A-1) and thereby shorten/reduce the overall size of the optical coupling region on the chip.

FIG. 2D shows an example of an intermediate optical mode converter 205A, in accordance with some embodiments. In some embodiments, the intermediate optical mode converter 205A is disposed to interrupt a sub-wavelength grating-based converter where the input optical mode 209 is still loosely guided. For example, the sub-wavelength optical waveguide 207A is optically connected to the input of the intermediate optical mode converter 205A. The input optical guiding section 217 is configured to receive and guide the input optical mode 209 from the sub-wavelength optical waveguide 207A. The input optical guiding section 217 is optically connected to the optical mode conversion section 219, and the optical mode conversion section 219 is optically connected to the output optical guiding section 221. The optical output guiding section 221 is optically connected to the output optical waveguide 215. The optical mode conversion section 219 is configured to convert the input optical mode 209 to the output optical mode 213 having a transverse size substantially confined within a transverse size of the output optical waveguide 215, where the transverse sizes of the output optical mode 213 and the output optical waveguide 215 are measured in a direction perpendicular to a propagation direction of the output optical mode 213.

The optical mode conversion section 219 includes a linear section 223 and an inverse taper section 224. A transverse size of the linear section 223 is substantially constant along a length (as measured in the light propagation direction) of the linear section 223. A transverse size of the inverse taper section 224 at an input end 224I of the inverse taper section 224 is substantially equal to the transverse size of the linear section 223. The transverse size of the inverse taper section 224 at an output end 224O of the inverse taper section 224 is substantially equal to the transverse size of an optical waveguide 225 within the output optical guiding section 221.

The input optical guiding section 217 is a sub-wavelength grating that includes a plurality of linearly arranged optical grating elements having a first transverse size. The optical mode conversion section 219 includes an input sub-wavelength transition section 227 that includes at least one optical grating element having a second transverse size that is different than the first transverse size of the plurality of linearly arranged optical grating elements of the input optical guiding section 217. In some embodiments, the second transverse size of the at least one optical grating element in the input sub-wavelength transition section 227 is smaller than the first transverse size of the plurality of linearly arranged optical grating elements of the input optical guiding section 217. Also, in some embodiments, the input sub-wavelength transition section 227 includes at least one optical grating element having a length size (as measured in the propagation direction of the input optical mode 209) that is different than a length size of an adjacently positioned one of the plurality of linearly arranged optical grating elements in the input optical guiding section 217. In some embodiments, the input sub-wavelength transition section 227 includes a final optical grating element 227A formed contiguous with the linear section 223. In some embodiments, the final optical grating element 227A has a transverse size larger than a transverse size of the linear section 223.

In some embodiments, the intermediate optical mode converter 205A goes directly from the loosely guided input optical mode 209 to about an 800 nanometer width strip optical waveguide 215 over a much shorter distance than would be possible for adiabatically tapered optical waveguide mode converter solutions, such as shown in FIG. 2A-1. The example intermediate optical mode converter 205A of FIG. 2D also shows how gradient or gradient-free optimization (for example, adjoint-based (inverse design) methods or genetic and particle swarm optimization) may be used in the design of the intermediate optical mode converter 205A. In some embodiments, the input optical mode 209 is multiple input optical modes, and the intermediate optical mode converter 205A functions to covert the multiple input optical modes into the tightly confined single output optical mode 213. Also, in some embodiments, the intermediate optical mode converter 205A can be used to convert from a loosely-confined strip optical waveguide input optical mode into a rib-optical waveguide, or slot-optical waveguide geometry.

In some embodiments, the intermediate optical mode converter 205 is built-up of multiple layers of materials to accomplish the optical coupling between materials and/or enhance performance in optical coupling between one input material and the same output material. FIG. 2E shows an example of an intermediate optical mode converter 205B that is built-up of at least two layers of materials, in accordance with some embodiments. The intermediate optical mode converter 205B includes the input optical guiding section 217 configured to receive and guide the input optical mode 209. The input optical guiding section 217 is formed at first vertical level. The input optical guiding section 217 has a transverse size that is less than a transverse size of the input optical mode 209. Again, the transverse sizes of the input optical guiding section 217 and the input optical mode 209 are measured in the direction perpendicular to the propagation direction of the input optical mode 209. The intermediate optical mode converter 205B also includes the output optical guiding section 221 formed at a second vertical level different than the first vertical level at which the input optical guiding section 217 is formed. The intermediate optical mode converter 205B also includes the optical mode conversion section 219 disposed between the input optical guiding section 217 and the output optical guiding section 221. The optical mode conversion section 219 spans both the first vertical level and the second vertical level. The optical mode conversion section 219 is configured to convert the input optical mode 209 to the output optical mode 213 having a transverse size substantially confined within a transverse size of the output optical waveguide 215 that is optically connected to the output optical guiding section 221. Again, the transverse sizes of the output optical mode 213 and the output optical waveguide 215 are measured in the direction perpendicular to the propagation direction of the output optical mode 213.

The optical mode conversion section 219 includes a taper section 231 formed to extend from the input optical guiding section 217 toward the output optical guiding section 221. The taper section 231 is formed at the first vertical level. The optical mode conversion section 219 also includes an inverse taper section 233 extending from the input optical guiding section 217 toward the output optical guiding section 221. The inverse taper section 233 is formed at the second vertical level. The inverse taper section is positioned to vertically overlap the taper section 231. The taper section 231 is configured to taper down to a point 231A proximate to the output optical guiding section 221. The inverse taper section 233 is configured to taper up from a point 233A proximate to the input optical guiding section 217. In this manner, as the optical mode 209 propagates through the optical mode conversion section 219, the optical mode 209 will encounter a gradual increase in the transverse size of the inverse taper section 233 in conjunction with encountering a decrease in the transverse size of the taper section 231, which causes the light to couple efficiently from the taper section 231 into the inverse taper section 233. In some embodiments, the taper section 231 and the inverse taper section 233 have a substantially same shape and size, where the taper section 231 and the inverse taper section 233 have reversed orientations along a propagation direction of light through the optical mode conversion section 219.

In some embodiments, the output optical guiding section 221 includes an optical waveguide 235 having a transverse size of that is substantially equal to a transverse size of the output optical waveguide 215. In some embodiments, the output optical guiding section 221 is a portion of the output optical waveguide 215. In some embodiments, the input optical guiding section 217 is a sub-wavelength grating that includes a plurality of linearly arranged optical grating elements having a first transverse size. Also, in these embodiments, the optical mode conversion section 219 includes an input sub-wavelength transition section 237 that includes at least one optical grating element having a second transverse size that is different than the first transverse size of the plurality of linearly arranged optical grating elements of the sub-wavelength grating of the input optical guiding section 217. In some embodiments, the second transverse size of the at least one optical grating element in the input sub-wavelength transition section 237 is smaller than the first transverse size of the plurality of linearly arranged optical grating elements of the sub-wavelength grating of the input optical guiding section 217. In some embodiments, the input sub-wavelength transition section 237 includes at least one optical grating element having a length size as measured in the propagation direction of the input optical mode 209 that is different than a length size of an adjacently positioned one of the plurality of linearly arranged optical grating elements. In some embodiments, the input sub-wavelength transition section 237 includes a final optical grating element 237A formed contiguous with the taper section 231. In some embodiments, the final optical grating element 237A has a transverse size larger than a transverse size of the taper section 231.

Figure 2F:
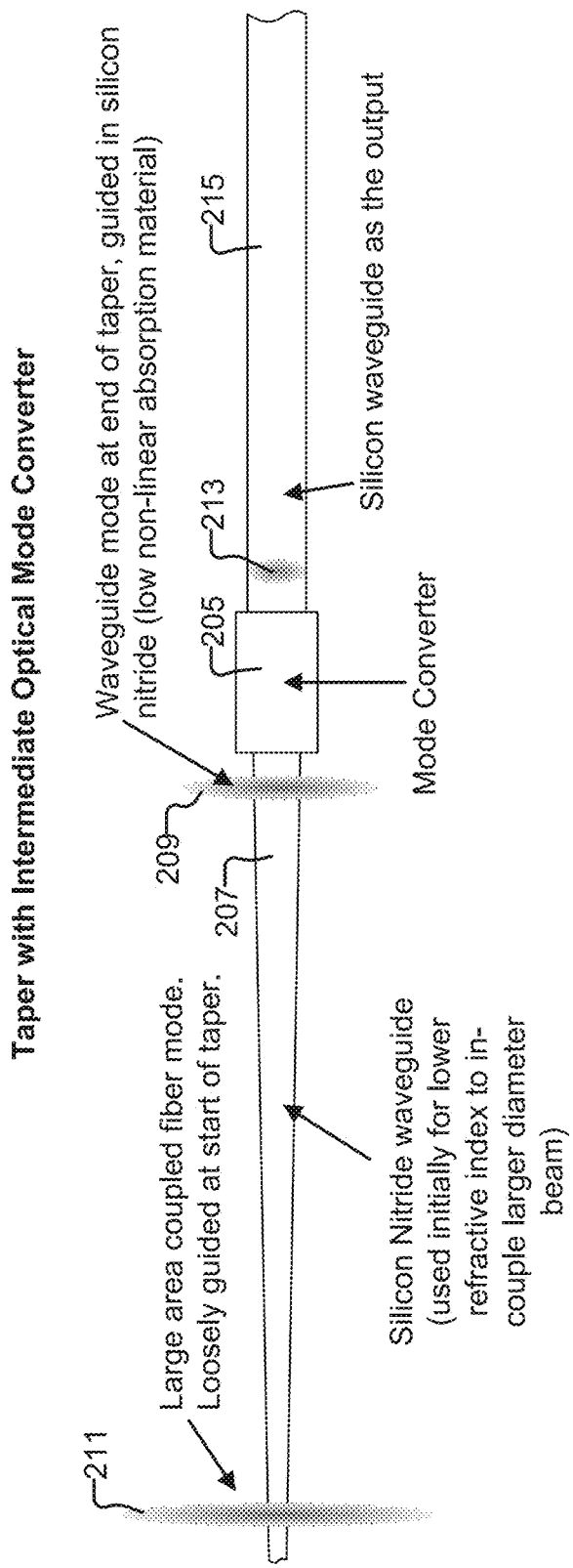
FIG. 2F shows use of the intermediate optical mode converter to optically connect the tapered input optical waveguide formed of silicon nitride to the output optical waveguide formed of silicon, in accordance with some embodiments.

In order to in-couple a large optical mode-field diameter from the external source (from the optical fiber), for a given material system, it is desirable to have the narrowest tip as possible at the input end of the tapered input optical waveguide in order to expand the optical mode. Also, in the case of using sub-wavelength gratings as the input optical waveguide, it is desirable to remove as much material per grating period as possible to expand the optical mode. However, due to fabrication restrictions on how small features can be sized, the desired degree of optical mode-expansion may not be possible for a given material system. Thus, in some embodiments, an optical waveguide platform capable of achieving a lower effective index (e.g., silicon nitride, a rib optical waveguide, or an optical waveguide formed primarily in thinner partially-etched silicon, among others) may be used to form the input optical waveguide. Then, the intermediate optical mode converter 205 disclosed herein can be used to route back to another optical waveguide material and geometry, such as silicon. For example, FIG. 2F shows use of the intermediate optical mode converter 205 to optically connect the tapered input optical waveguide 207 formed of silicon nitride to the output optical waveguide 215 formed of silicon, in accordance with some embodiments. The intermediate optical mode converter 205 receives as input loosely guided light as the optical mode 209 from the silicon nitride tapered input optical waveguide 207. The intermediate optical mode converter 205 outputs strongly confined light as the optical mode 213 within the silicon optical waveguide 215.

In some implementations of a tapered optical waveguide pattern, an optical waveguide with sub-wavelength grating elements is used to assist in reduction of the effective refractive index of the optical mode, which allows for expansion of the optical mode. However, due to fabrication restrictions on the minimum size between the grating elements, a smooth transition from the spatially separate sub-wavelength grating elements to an optical waveguide may not be possible, or at least may be prohibitively expensive. Therefore, a transition can be used to go from pure sub-wavelength optical grating elements to optical grating elements that have an optical waveguide extending through the center of the optical grating elements. The transverse size of the optical waveguide that extends through the center of the optical grating elements is eventually tapered up to match the transverse size of the optical grating elements, which allows for transition to an optical waveguide of full transverse size. However, this process requires careful design of the transition element and is sensitive to fabrication errors as the optical grating elements that have the optical waveguide extending through their centers have sharp corners that are difficult to resolve with photolithographic fabrication processes. Rather than use the transition element that has the optical waveguide extending through the center of the optical grating elements as mentioned above, which relies on an inline transition from the sub-wavelength grating to the transition element, embodiments are disclosed herein for transfer of optical power from the sub-wavelength grating to another optical waveguide through evanescent coupling.

Figure 3A:
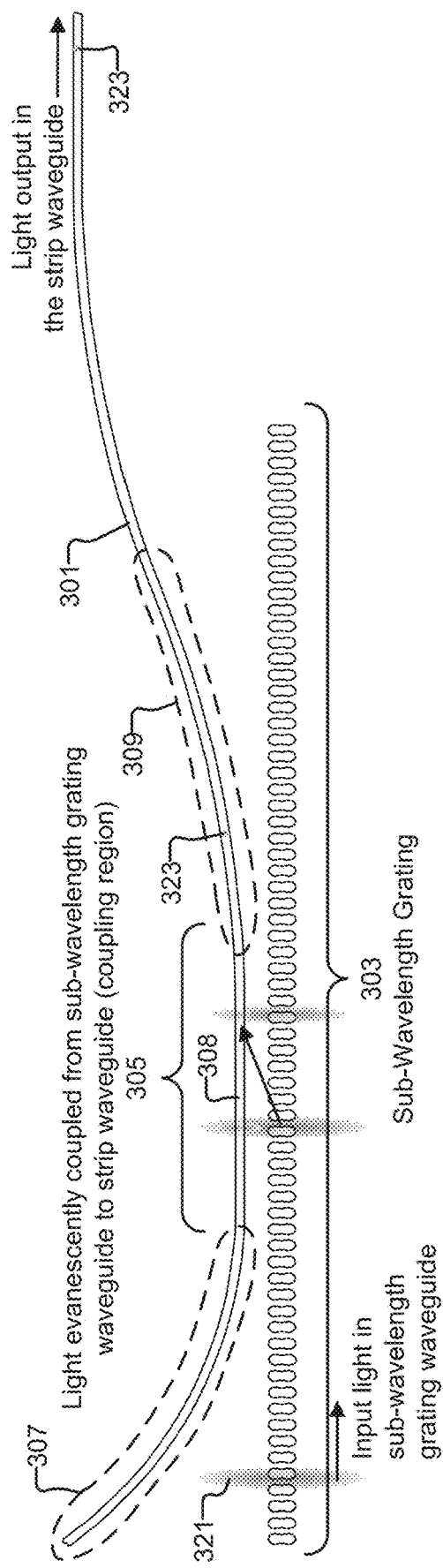
FIG. 3A shows an example of an optical coupler that includes a strip optical waveguide that approaches and runs proximate and parallel to a sub-wavelength grating through a coupling region to enable evanescent coupling of light between the sub-wavelength grating and the strip optical waveguide within the coupling region, in accordance with some embodiments.
Figure 3B:
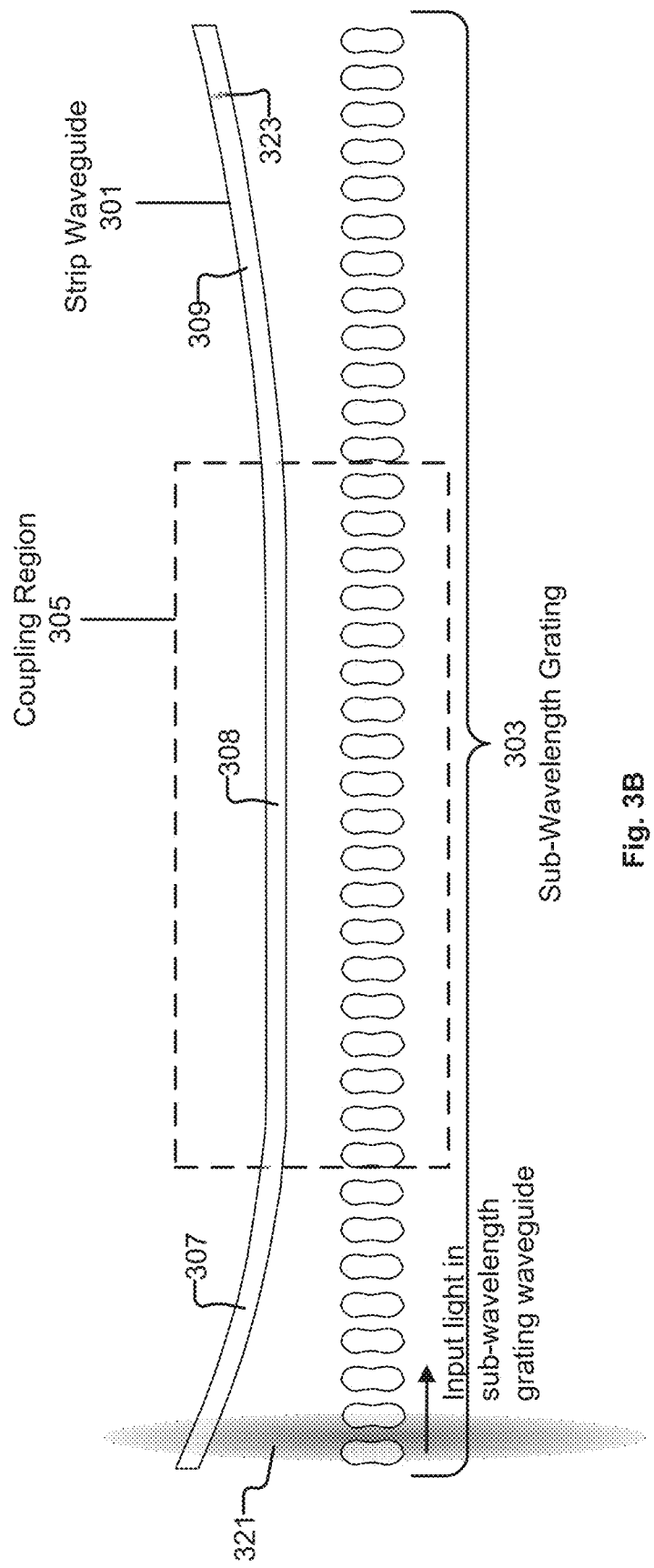
FIG. 3B shows a close-up view of the coupling region of FIG. 3A, in accordance with some embodiments.

FIG. 3A shows an example of an optical coupler that includes a strip optical waveguide 301 that approaches and runs proximate and parallel to a sub-wavelength grating 303 through a coupling region 305 to enable evanescent coupling of light between the sub-wavelength grating 303 and the strip optical waveguide 301 within the coupling region 305, in accordance with some embodiments. FIG. 3B shows a close-up view of the coupling region 305 of FIG. 3A, in accordance with some embodiments. In some embodiments, the input sub-wavelength grating 303 extends in a substantially linear configuration. The strip optical waveguide 301 includes a first curved section 307 that extends toward the sub-wavelength grating 303 and that turns parallel to the sub-wavelength grating 303. The strip optical waveguide 301 includes a coupling section 308 that extends from the first curved section 307 substantially parallel to the sub-wavelength grating 303. The coupling section 308 extends through the coupling region 305. The coupling section 308 is positioned within an evanescent optical coupling distance of the sub-wavelength grating 303. The strip optical waveguide 301 includes a second curved section 309 that extends from the coupling section 308 and that curves away from the sub-wavelength grating 303. In some embodiments, the sub-wavelength grating 303 is formed at a first vertical level and the coupling section 308 is formed at a second vertical level different than the first vertical level. In some embodiments, the strip optical waveguide 301 is formed vertically above the sub-wavelength grating 303. The input light that propagated along the sub-wavelength grating 303 is evanescently coupled into the strip optical waveguide 301, with an input optical mode 321 converted into an output optical mode 323.

Figure 3C:
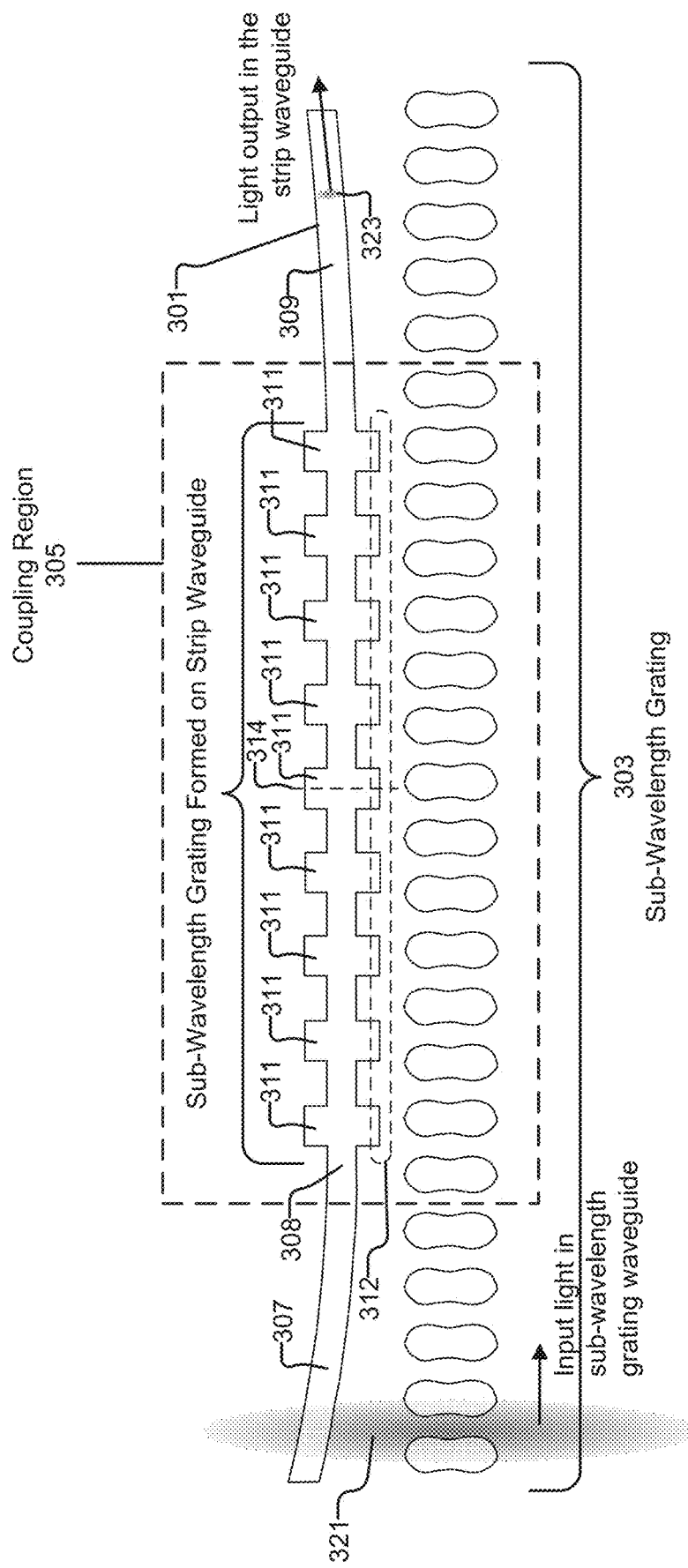
FIG. 3C shows the coupling region of FIG. 3B with the coupling section of the strip optical waveguide modified to include sub-wavelength coupling features, in accordance with some embodiments.

In some embodiments, the coupling region 305 between the sub-wavelength grating 303 and the strip optical waveguide 301 can be optimized or patterned with additional sub-wavelength features. FIG. 3C shows the coupling region 305 of FIG. 3B with the coupling section 308 of the strip optical waveguide 301 modified to include sub-wavelength coupling features 311, in accordance with some embodiments. In some embodiments, the sub-wavelength coupling features 311 form a sub-wavelength grating along the coupling section 308 of the strip optical waveguide 301. The sub-wavelength coupling features 311 are integrally formed with the coupling section 308 of the strip optical waveguide 301. The sub-wavelength coupling features 311 serve to modify the evanescent optical coupling behavior of different wavelengths of light. In some embodiments, a plurality of the sub-wavelength coupling features 311 are formed in a spaced apart manner along the coupling section 308 of the strip optical waveguide 301. In some embodiments, each of the sub-wavelength coupling features 311 has a transverse size larger than a transverse size of the strip optical waveguide 301. In some embodiments, each of the sub-wavelength coupling features 311 has a substantially equal shape and size. In some embodiments, the sub-wavelength coupling features 311 are spaced apart in accordance with a substantially equal pitch. In some embodiments, a transverse centerline, e.g., 314, of each of the sub-wavelength coupling features 311 is oriented substantially perpendicular to a lengthwise centerline of the strip optical waveguide 301 within the coupling section 305. In some embodiments, edges 312 of the plurality of sub-wavelength coupling features 311 closest to the input sub-wavelength grating 303 are substantially co-aligned.

Figure 4:
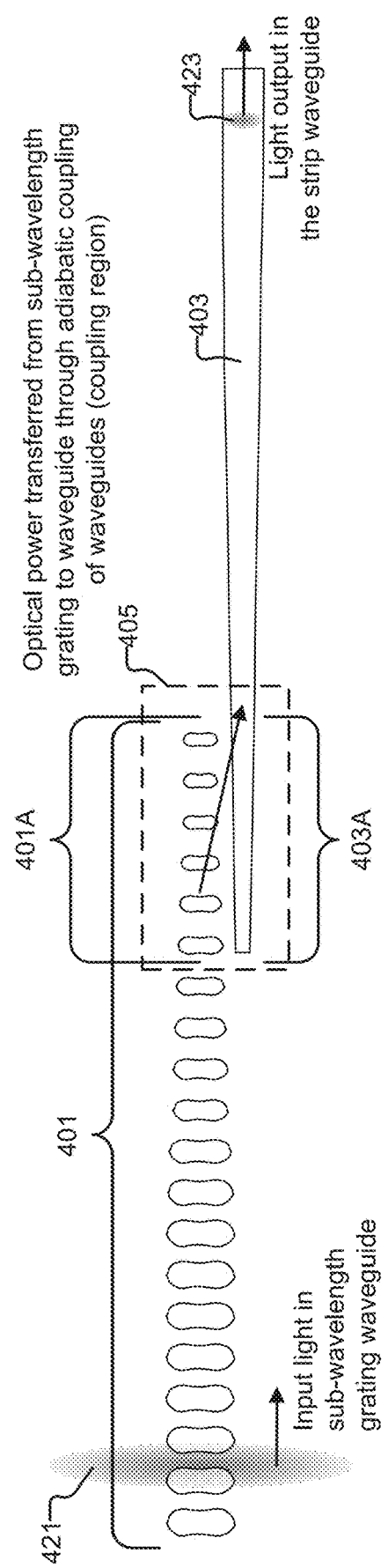
FIG. 4 shows an example of an optical coupler that includes a sub-wavelength grating that is adiabatically tapered down (in the light propagation direction) through an optical coupling region, with a strip optical waveguide positioned proximate to the sub-wavelength grating, where the strip optical waveguide is tapered up (in the light propagation direction) through the optical coupling region, in accordance with some embodiments.

FIG. 4 shows an example of an optical coupler that includes a sub-wavelength grating 401 that is adiabatically tapered down (in the light propagation direction) through an optical coupling region 405, with a strip optical waveguide 403 positioned proximate to the sub-wavelength grating 401, where the strip optical waveguide 403 is tapered up (in the light propagation direction) through the optical coupling region 405, in accordance with some embodiments. In some embodiments, the sub-wavelength grating 401 is an input sub-wavelength grating 401. In some embodiments, the sub-wavelength grating 401 extends in a substantially linear configuration. In some embodiments, the sub-wavelength grating 401 has a terminal tapered section 401A. In some embodiments, the strip optical waveguide 403 is a target optical waveguide 403. In some embodiments, the strip optical waveguide 403 extends in a substantially linear configuration substantially parallel to the input sub-wavelength grating 401. In some embodiments, the strip optical waveguide 403 has an input inverse taper section 403A positioned within an evanescent optical coupling distance of the terminal tapered section 401A of the sub-wavelength grating 401, so as to form the optical coupling region 405 between the sub-wavelength grating 401 and the strip optical waveguide 403. In some embodiments, the terminal tapered section 401A of the sub-wavelength grating 401 is adiabatically tapered down while the input inverse taper section 403A of the strip optical waveguide 403 is tapered up. The input light that propagates along the sub-wavelength grating 401 is evanescently coupled into the strip optical waveguide 403, with an input optical mode 421 converted into an output optical mode 423.

In some embodiments, the sub-wavelength grating 401 is formed at a first vertical level, and the strip optical waveguide 403 is formed at a second vertical level different than the first vertical level. In some embodiments, a lengthwise centerline of the sub-wavelength grating 401 is offset from a lengthwise centerline of the strip optical waveguide 403. In some embodiments, the terminal tapered section 401A of the sub-wavelength grating 401 includes a plurality of optical grating elements, where respective transverse sizes of the plurality of optical grating elements decrease along a direction of light propagation through the terminal tapered section 401A. In some embodiments, each of the plurality of optical grating elements has a respective length size as measured in the direction of light propagation through the terminal tapered section 401A, where respective length sizes of the plurality of optical grating elements decrease along the direction of light propagation through the terminal tapered section 401A.

Figure 5A:
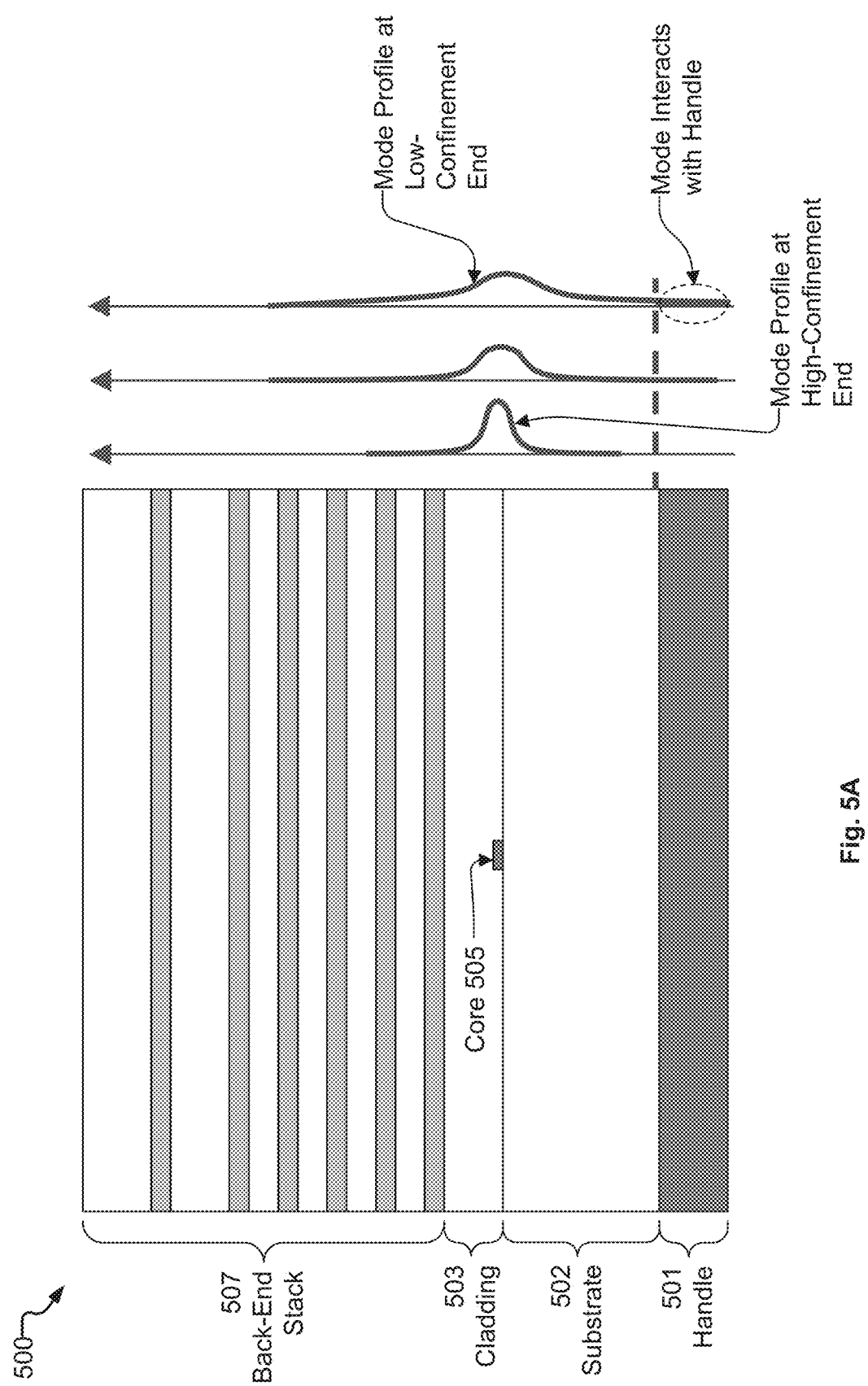
FIG. 5A shows an example cross-section of an optical coupling device, in accordance with some embodiments.

FIG. 5A shows an example cross-section of an optical coupling device 500, in accordance with some embodiments. In some embodiments, the optical coupling device 500 is a spot-size converter in a silicon-on-insulator (SOI) process. The optical coupling device 500 includes a handle 501 and a substrate 502. The optical coupling device 500 also includes an optical waveguide 505 disposed on the substrate 502. An index of refraction of the optical waveguide 505 is greater than an index of refraction of the substrate 502. The optical coupling device 500 also includes a cladding material 503 disposed alongside and above the optical waveguide 505. In some embodiments, the optical waveguide 505 is a semiconductor core surrounded by low-index oxide cladding material 503. An index of refraction of the cladding material 503 is less than the index of refraction of the optical waveguide 505. The optical coupling device 500 also includes a back-end stack 507 formed above the cladding material 503. In some embodiments, the optical waveguide 505 varies between the high-confinement and the low-confinement end of the optical coupling device 500. In some embodiments, the guided optical mode correspondingly has an increased transverse size at the low-confinement end of the optical coupling device 500. Proximity to the handle 501, e.g., silicon handle 501, causes the guided optical mode at the low-confinement end of the optical coupling device 500 to interact with the handle 501, which can lead to high optical loss.

Figure 5B:
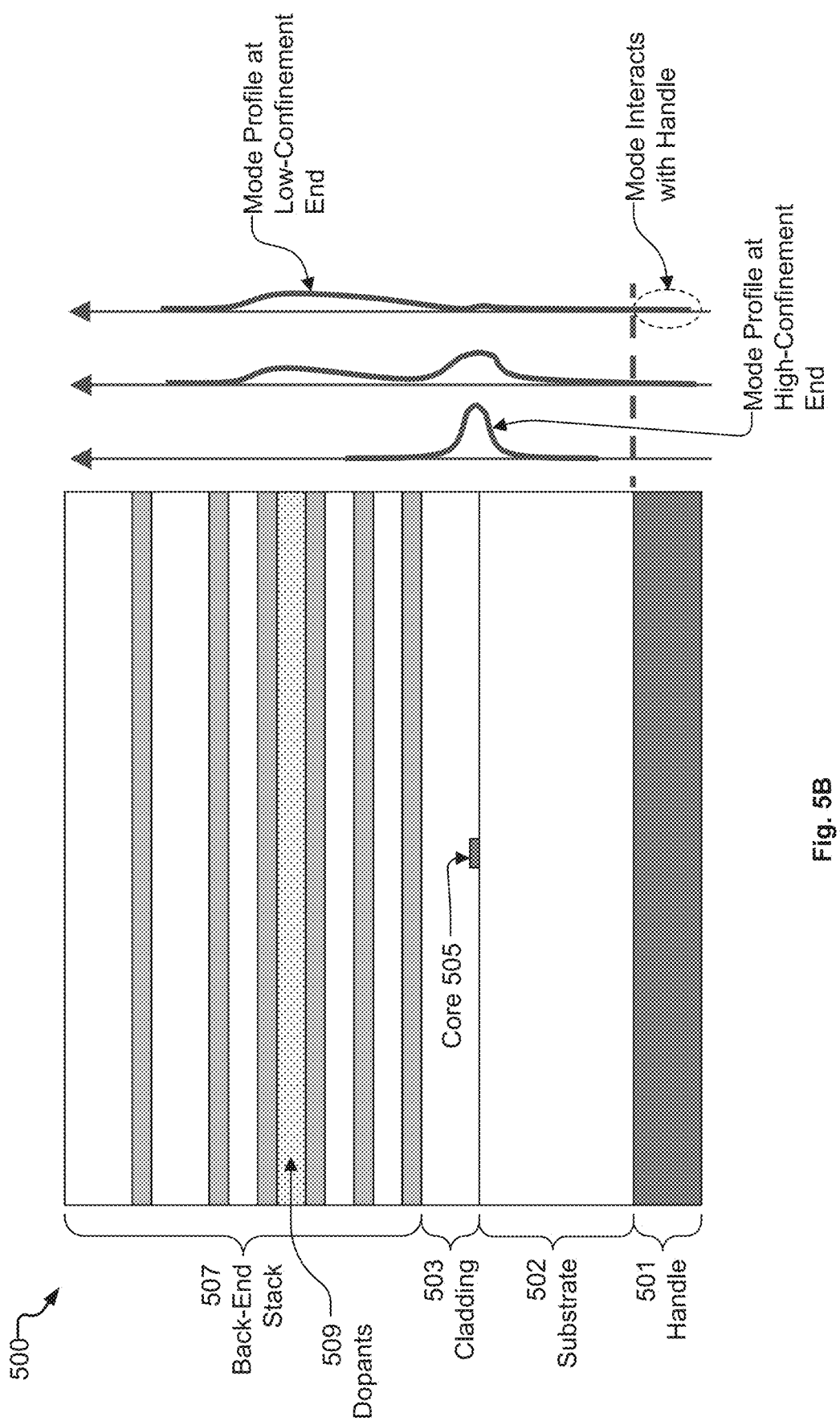
FIG. 5B shows the example cross-section of the optical coupling device of FIG. 5A, with the back-end stack including a doped layer formed above and over the optical waveguide, in accordance with some embodiments.

FIG. 5B shows the example cross-section of the optical coupling device 500, with the back-end stack 507 including a doped layer 509 formed above and over the optical waveguide 505, in accordance with some embodiments. The doped layer 509 is configured to extend along the optical waveguide 505 in a direction of propagation of the optical mode through the optical coupling device 500. In some embodiments, the doped layer 509 is vertically positioned relative to the optical waveguide 505 such that the guided optical mode overlaps the optical waveguide 505. The doped layer 509 is positioned and configured to guide the optical mode at a sufficiently high vertical level within the optical coupling device 500 relative to the handle 501 so as to substantially prevent interaction of the guided optical mode with the handle 501. Therefore, the doped layer 509 positioned above the optical waveguide 505 in the back-end stack 507 serves to mitigate the problem of the guided optical mode at the low-confinement end of the optical coupling device 500 interacting with the handle 501. In some embodiments, such as shown in FIG. 5B, the doped layer 509 has a transverse size that is larger than a transverse size of the guided optical mode, where the transverse size of the doped layer 509 and the transverse size of the guided optical mode are measured in a direction perpendicular to a direction of propagation of the guided optical mode through the optical coupling device 500. It should be understood that while the example optical coupling device 500 shows one doped layer 509 within the back-end stack 507 for purposes of description, in various embodiments, the back-end stack 507 can include essentially any number of doped layers 509, with each doped layer 509 having an independently defined size and shape.

In some embodiments, the doped layer 509 can provide a higher refractive index in a portion of the back-end stack 507. Light propagating along the optical coupling device 500 will be guided near this higher refractive index portion of the back-end stack 507 at the low-confinement end of the optical coupling device 500. In some embodiments, an optical fiber is attached to the optical coupling device 500 such that a core of the optical fiber is optically aligned with the optical mode corresponding to the higher refractive index portion of the back-end stack 507. In some embodiments, a V-groove holds the optical fiber at a depth within the chip consistent with aligning the core of the optical fiber at a position corresponding to the higher refractive index portion of the back-end stack 507 as defined by the doped layer 509. In some embodiments, the higher refractive index portion of the back-end stack 507 defined by the doped layer 509 may be up-doped (e.g., doped with Germanium) relative to the surrounding portions of back-end stack 507. In some embodiments, the higher refractive index portion of the back-end stack 507 is formed by down-doping (e.g., doping with Fluorine) portions of the back-end stack 507 that surround the higher refractive index portion of the back-end stack 507. In some embodiments, the higher refractive index portion of the back-end stack 507 is formed by doping of silicon oxide to control refractive index. In various embodiments, germanium, fluorine, boron, chlorine, erbium, ytterbium, praseodymium, and/or other species are used to dope silicon oxide to control refractive index in the back-end stack 507. In some embodiments, the refractive index of a nitride portion of the back-end stack 507 is controlled by changing a material composition within the nitride portion.

Figure 5C:
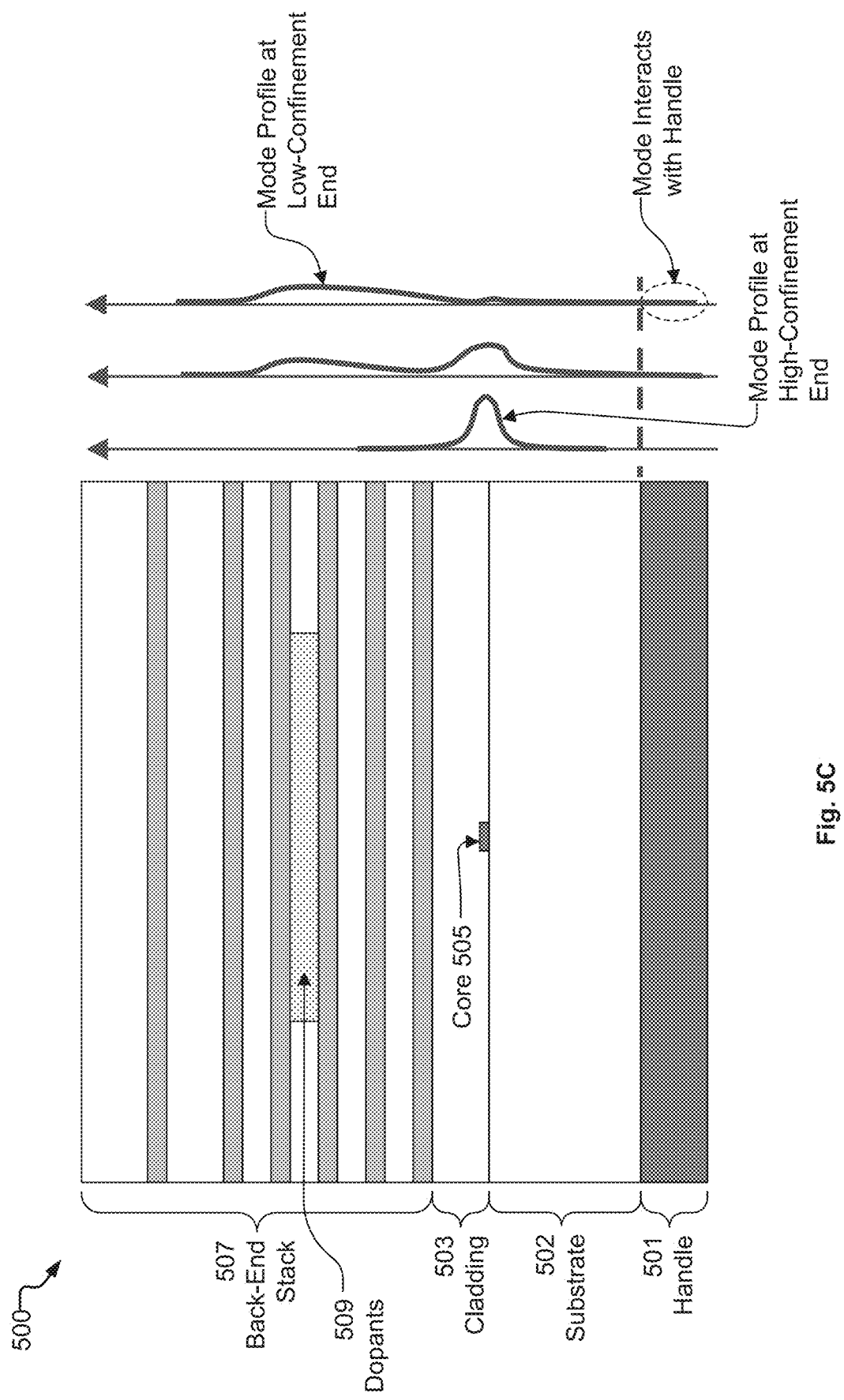
FIG. 5C shows a variation of the example cross-section of the optical coupling device of FIG. 5B in which the doped layer has a transverse size that is substantially equal to a transverse size of the guided optical mode, in accordance with some embodiments.

FIG. 5C shows a variation of the example cross-section of the optical coupling device 500 of FIG. 5B in which the doped layer 509 has a reduced transverse size that is substantially equal to a transverse size of the guided optical mode, in accordance with some embodiments. FIG. 5D shows use of a mask or patterned photoresist 511 to spatially control disposal of dopants 513 in the back-end stack 507 for refractive index modification, so that dopants 513 are only incorporated where desired, in accordance with some embodiments. In various embodiments, dopants 513 are disposed in selected portions of the back-end stack 507 to provide fine control of the refractive index. In some embodiments, dopants 513 are disposed in tightly controlled regions so that performance of circuits on the same wafer is not impacted. In various embodiments, dopants 513 are incorporated during oxide or nitride formation, or by ion implantation during production of the back-end stack 507. In some embodiments, the dopants 513 are disposed in a region much wider than the guided optical mode within the optical coupling device 500, such as shown by the doped layer 509 in FIG. 5B, since even the reduced optical waveguide 505 can provide some lateral optical mode localization. In some embodiments, the dopants 513 are disposed in a region comparable to the guided optical mode size, such as shown in FIG. 5C, so that the dopant 513 profile helps define the transverse shape of the guided optical mode, coupling between optical modes, etc. Also, in some embodiments, the refractive index of doped oxides can be tuned after oxide formation by exposure to ultraviolet radiation, thermal treatment, etc. It should be understood that any of the optical coupling devices disclosed herein, such as described with regard to FIGS. 1A-1D, 3A-3C, 4, and 5A-5D, can be implemented within the optical mode converter 205, and particularly within the optical mode conversion section 219 of the optical mode converter 205.

The foregoing description of the embodiments has been provided for purposes of illustration and description, and is not intended to be exhaustive or limiting. Individual elements or features of a particular embodiment are generally not limited to that particular embodiment, but, where applicable, are interchangeable and can be used in a selected embodiment, even if not specifically shown or described. In this manner, one or more features from one or more embodiments disclosed herein can be combined with one or more features from one or more other embodiments disclosed herein to form another embodiment that is not explicitly disclosed herein, but rather that is implicitly disclosed herein. This other embodiment may also be varied in many ways. Such embodiment variations are not to be regarded as a departure from the disclosure herein, and all such embodiment variations and modifications are intended to be included within the scope of the disclosure provided herein.

Although some method operations may be described in a specific order herein, it should be understood that other housekeeping operations may be performed in between method operations, and/or method operations may be adjusted so that they occur at slightly different times or simultaneously or may be distributed in a system which allows the occurrence of the processing operations at various intervals associated with the processing, as long as the processing of the method operations are performed in a manner that provides for successful implementation of the method.

Although the foregoing embodiments have been described in some detail for purposes of clarity of understanding, it will be apparent that certain changes and modifications can be practiced within the scope of the appended claims. Accordingly, the embodiments disclosed herein are to be considered as illustrative and not restrictive, and are therefore not to be limited to just the details given herein, but may be modified within the scope and equivalents of the appended claims.

What is claimed is:

1. An optical coupling device, comprising:
a substrate;
an optical waveguide disposed on the substrate, wherein an index of refraction of the optical waveguide is greater than an index of refraction of the substrate, the optical waveguide having a transverse size measured in a direction perpendicular to a light propagation direction through the optical waveguide;
a cladding material disposed alongside and above the optical waveguide, wherein an index of refraction of the cladding material is less than the index of refraction of the optical waveguide;
a first optical buffering layer disposed within the cladding material above the optical waveguide, the first optical buffering layer having an index of refraction greater than the index of refraction of the cladding material, wherein the first optical buffering layer is formed as a first sub-wavelength grating that includes multiple optical grating elements arranged in a linear configuration along the optical waveguide, each of the multiple optical grating elements of the first sub-wavelength grating having a transverse size measured in the direction perpendicular to the light propagation direction through the optical waveguide that is greater than the transverse size of the optical waveguide;
a second optical buffering layer disposed within the cladding material above the optical waveguide and above the first optical buffering layer, the second optical buffering layer having an index of refraction greater than the index of refraction of the cladding material, wherein the second optical buffering layer is formed as a second sub-wavelength grating that includes multiple optical grating elements arranged in a linear configuration along the optical waveguide, each of the multiple optical grating elements of the second sub-wavelength grating having a transverse size measured in the direction perpendicular to the light propagation direction through the optical waveguide that is greater than the transverse size of the optical waveguide; and
a third optical buffering layer disposed within the cladding material above the optical waveguide and above the second optical buffering layer, the third optical buffering layer having an index of refraction greater than the index of refraction of the cladding material, wherein the third optical buffering layer is formed as a third sub-wavelength grating that includes multiple optical grating elements arranged in a linear configuration along the optical waveguide, each of the multiple optical grating elements of the third sub-wavelength grating having a transverse size measured in the direction perpendicular to the light propagation direction through the optical waveguide that is greater than the transverse size of the optical waveguide.

2. The optical coupling device as recited in claim 1, wherein a transverse size of one or more of the first, second, and third optical buffering layers is larger than a transverse size of an optical mode of the optical waveguide.

3. The optical coupling device as recited in claim 1, wherein a transverse size of one or more of the first, second, and third optical buffering layers is approximately equal to a transverse size of an optical mode of the optical waveguide.

4. The optical coupling device as recited in claim 1, wherein the first, second, and third optical buffering layers are vertically stacked with the cladding material interposed between vertically adjacent ones of the first, second, and third optical buffering layers.

5. The optical coupling device as recited in claim 1, wherein the first, second, and third optical buffering layers are formed of a same material having a substantially same index of refraction.

6. The optical coupling device as recited in claim 1, wherein the first, second, and third optical buffering layers are formed of at least two different materials having different indexes of refraction.

7. The optical coupling device as recited in claim 1, wherein each of the first, second, and third optical buffering layers has a substantially equal transverse size.

8. The optical coupling device as recited in claim 1, wherein at least two of the first, second, and third optical buffering layers have different transverse sizes.

9. The optical coupling device as recited in claim 1, further comprising:
a sub-level optical buffering layer disposed within the substrate below the optical waveguide, the sub-level optical buffering layer having an index of refraction greater than the index of refraction of the substrate.

10. The optical coupling device as recited in claim 9, wherein a transverse size of the sub-level optical buffering layer as measured in the direction perpendicular to the light propagation direction through the optical waveguide is larger than a transverse size of an optical mode of the optical waveguide.

11. The optical coupling device as recited in claim 9, wherein a transverse size of the sub-level optical buffering layer as measured in the direction perpendicular to the light propagation direction through the optical waveguide is approximately equal to a transverse size of an optical mode of the optical waveguide.

12. The optical coupling device as recited in claim 1, wherein the transverse size of the optical grating elements of the second sub-wavelength grating is greater than the transverse size of the optical grating elements of the first sub-wavelength grating.

13. The optical coupling device as recited in claim 1, wherein the transverse size of the optical grating elements of the third sub-wavelength grating is less than the transverse size of the optical grating elements of the second sub-wavelength grating.

14. The optical coupling device as recited in claim 1, wherein the transverse size of one or more of the first, second, and third optical buffering layers has an inverse taper configuration along the light propagation direction through the optical waveguide.

15. The optical coupling device as recited in claim 14, wherein the transverse size of the optical waveguide has an inverse taper configuration along the light propagation direction through the optical waveguide.

16. The optical coupling device as recited in claim 15, wherein the inverse taper configuration of the transverse size of the optical waveguide substantially matches the inverse taper configuration of the transverse size of one or more of the first, second, and third optical buffering layers.

* * * * *